United States Patent [19]
Chen et al.

[11] Patent Number: 5,426,618
[45] Date of Patent: Jun. 20, 1995

[54] METHOD OF HIGH RESOLUTION AND HIGH SNR DATA ACQUISITION FOR PROBING USING PULSE-COMPRESSION

[76] Inventors: Hong-Bin Chen, 833 E. Brighton Ave., Apt. 704, Syracuse, N.Y. 13205; Neng E. Wu, 120 Saybrook La., DeWitt, N.Y. 13214

[21] Appl. No.: 56,429

[22] Filed: May 3, 1993

[51] Int. Cl.[6] .............................................. G01V 1/36
[52] U.S. Cl. ...................................... 367/42; 367/49; 367/50; 364/421
[58] Field of Search ............................ 367/42, 49, 50; 364/421

[56] References Cited

U.S. PATENT DOCUMENTS

| | | | |
|---|---|---|---|
| 3,234,504 | 2/1966 | Wischmeyer | 367/189 |
| 3,264,606 | 8/1966 | Crook et al. | 367/39 |
| 3,622,970 | 11/1971 | Sayous et al. | 367/41 |
| 4,607,353 | 8/1986 | Muir et al. | 367/39 |
| 5,253,219 | 10/1993 | Houston et al. | 367/79 |

OTHER PUBLICATIONS

Cunningham, A. B.; Geophysics, vol. 44, #12, pp. 1901 et seq; Dec. 1979.
Chen et al, SEG 60th Annual Mtg., Anaheim, California, 1988; 3 pages.

Primary Examiner—Nelson Moskowitz

[57] ABSTRACT

Excellent likeness of impulse response function $r_0(t)$ of a given linear space is obtained by exciting the space through a transmitting transducer with a compressible probing signal $x(t)$ which is a string of lowpass narrow $p(t)$-wavelets polarity-controlled by a single cycle of an m-sequence and processing received raw-data by cross-correlating it with a special reference $s(t)$ which is cyclical repetition of the same m-sequence. Cross-correlating $x(t)$ directly with $s(t)$ yields compressed version of $x(t)$ (denoted $e(t)$) which is $p(t)$ multiplied by length of the m-sequence. $e(t)$ equivalently excites the space to give processed output which is the likeness of $r_0(t)$. $e(t)$ is free from side-lobes and readily made arbitrarily slim by choosing $p(t)$ slim; keeping duration and energy of $x(t)$ fixed, $e(t)$ characterizes an area invariant of the slimness of $e(t)$ or $p(t)$. Above qualities of $e(t)$ eliminate causes of inability to achieve high resolution and high SNR and need for increased excitation and increased power rating of transmitting transducer of conventional method which uses signal CHIRP. Cross-correlated with $s(t)$, colored noise is minimized. Choosing width of $p(t)$ narrower than width of the impulse response function of transmitting transducer makes feasible use of transmitting transducer of further reduced power rating. Consequently, high resolution, high SNR, deep penetration, and reduced power rating of transmitting transducer are simultaneously accomplished.

17 Claims, 6 Drawing Sheets

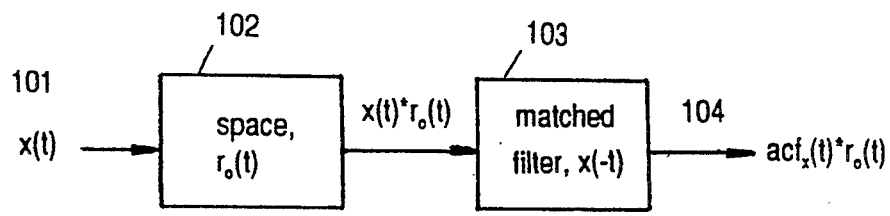
Fig.1-a
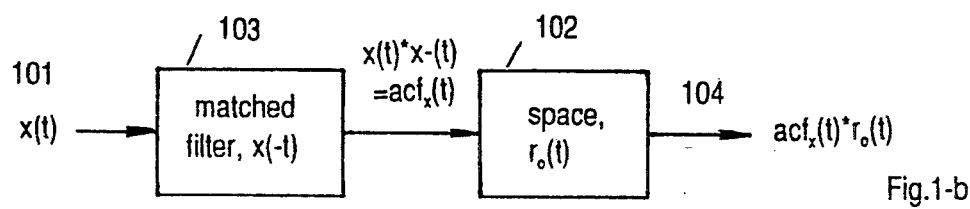
Fig.1-b
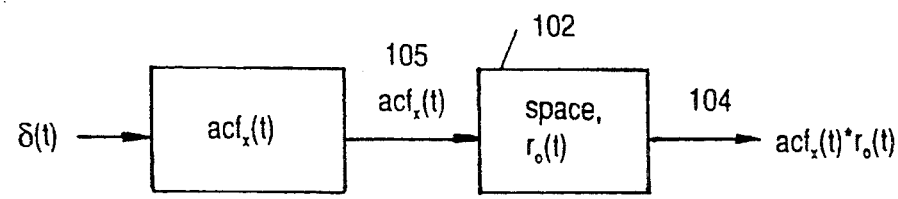
Fig.1-c
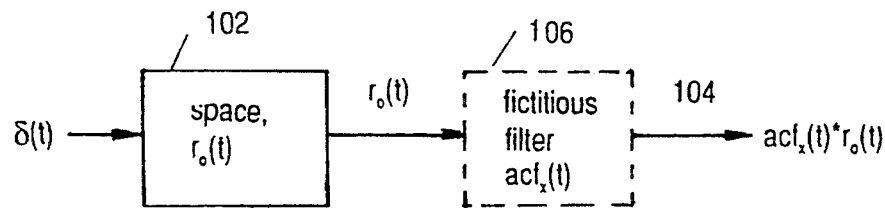
Fig.1-d

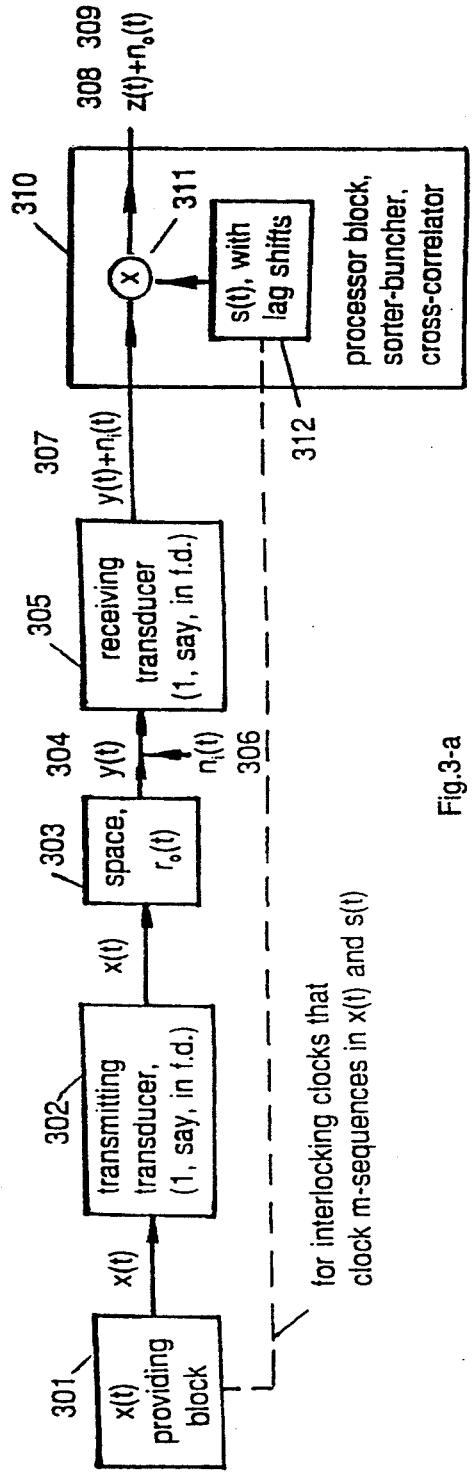
Fig.3-a
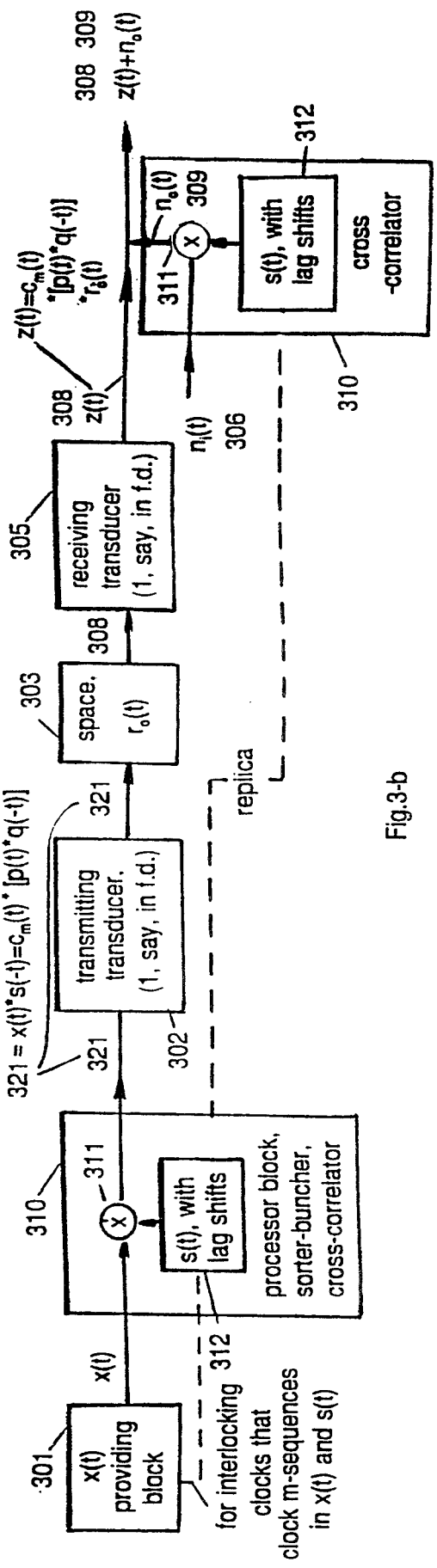
Fig.3-b

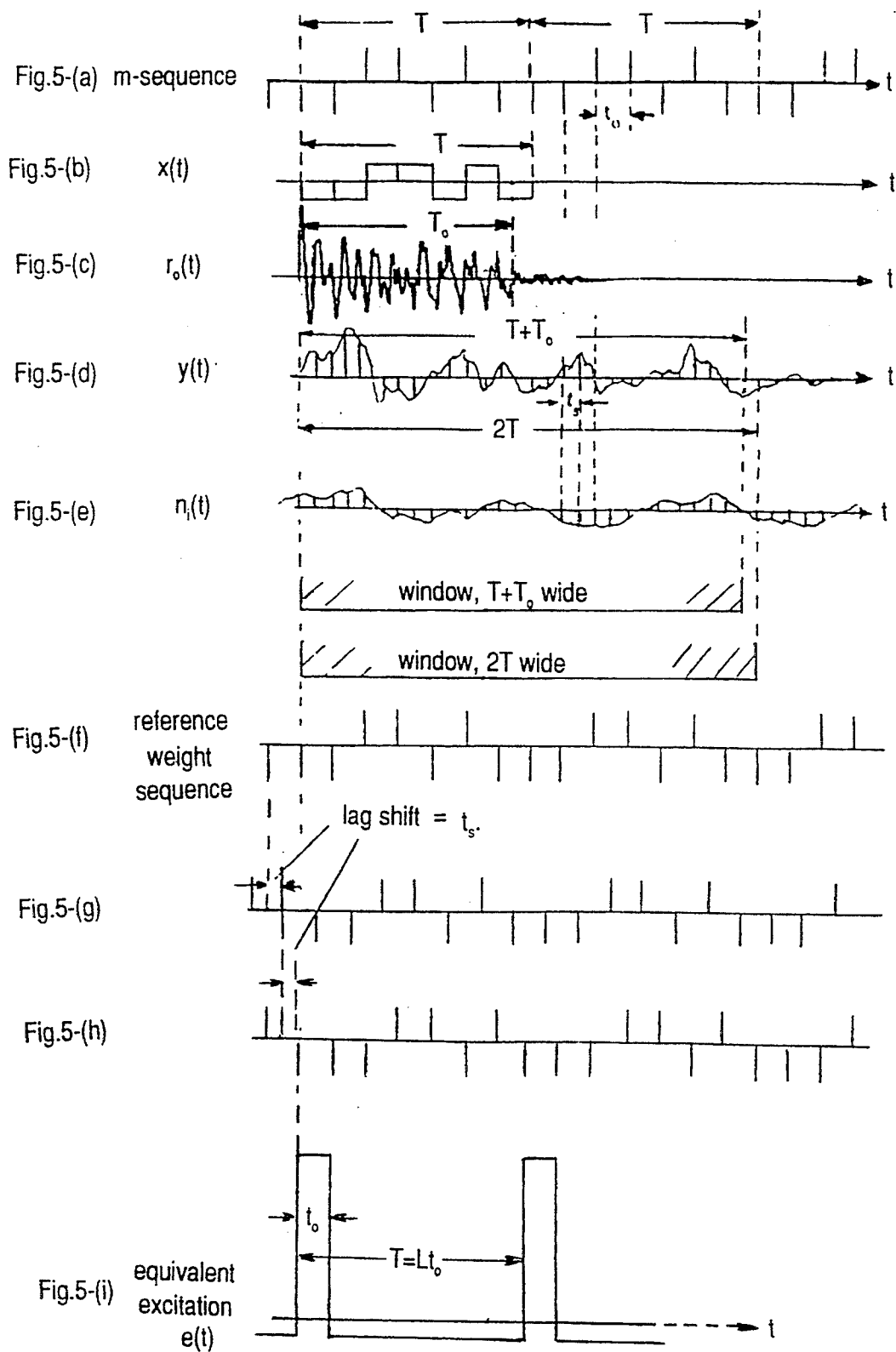

Fig.6-1-a clocking sequence L=63

Fig.6-1-b p(t)

Fig.6-1-c x(t), duration and energy of x(t) fixed [L=63]

Fig.6-1-d system, h(t)

Fig.6-1-g Fig.6-1-f ⊗ [cyclical repetition of Fig.6-1-a]

Fig.6-1-h Lp(t) [L=63]

Fig.6-2-a clocking sequence L=127

Fig.6-2-b p(t)

Fig.6-2-c x(t), duration and energy of x(t) fixed [L=127]

Fig.6-2-d system, the same h(t)

Fig.6-2-g Fig.6-2-f ⊗ [cyclical repetition of Fig.6-2-a]

Fig.6-2-h Lp(t) [L=127]

METHOD OF HIGH RESOLUTION AND HIGH SNR DATA ACQUISITION FOR PROBING USING PULSE-COMPRESSION

BACKGROUND

1. Field of the Invention

This invention relates to the method for estimation of the durations for a FINITE DURATION compressible signal to travel from a given transmitting site to a given receiving site through unknown multiple ray paths of all kinds in a given space of practically linear transmission media. More particularly, it relates to a method for improving the performance of the method for estimation of the durations for a given signal to travel between two given points in a given multiple-path signal transmission space using pulse-compression technique.

As compared with the currently popular conventional pulse-compression probing methods which use bandpass signals (typically the chirp) as probing signals and matched filters (or its equivalent cross-correlators) as processors, the aspects of performance improvements are: elimination of side-lobe interference, great enhancement of resolution without need for increase of excitation power/energy, great upgrading of signal-to-noise ratio particularly when the background noise is colored, notably extended probing range, and time-economic data processing. Comparison is made on the bases of employing the same amount of nominal probing signal energy input to the transmitting transducer and using the same basic transmitting and receiving equipment.

The probing signal and the processing mechanism used in the method of the invention are different from those used in the conventional methods. The improvements are particularly remarkable when the traveling times for different paths are crowded and merge into a continuum and/or when the background noise is non-white.

Interesting enough, the method of the invention also features feasibility to safely use transmitting transducer of REDUCED REQUIRED POWER RATING to excite the space yet after processing to eventually yield a VALID required useful output at an unreduced required intensity with simultaneous accomplishment of VERY HIGH RESOLUTION.

The method and system of the invention disclosed herein can be used for seismic geophysical exploration, deep earth crust investigation, earth crust strata movement monitoring, and all kinds of sonic probing including medical probing and mechanical flaw detection. In a more general sense, however, the spirit of method of the invention is ramifiable and applicable to all types of pulse-compression probing applications for estimation of signal travel time that demand elimination of side-lobe problems, high resolution, effective suppression of background noise particularly when it is non-whim, greater probing range at a given excitation energy level, smaller transmitting transducer size, and time-economy in raw data acquisition and processing.

2. From Narrow Pulse Echo Probing to the Use of Long Compressible Probing Signals—The Notion of Equivalent Excitation and the Need for a Narrow Equivalent Excitation Classically, given the speed of signal wave propagation in a space, sending a narrow enough pulse excitation as a probing signal into the space that contains reflectors and measuring the times elapsed between the instant of transmitting the probing narrow pulse and the instants of arrivals of the reflected waves, one can estimate the distances between the reflectors and the transmit-receive point along the ray paths. With time as abscissa, the recording of reflections to be used for estimating the two-way travel times between the reflectors and the transmit-receive point is referred to as a likeness of the plot of the true impulse response function of the space containing reflectors. The plot of a true impulse response function of the space is the limiting case of a recording of the reflections when the narrow pulse tends to a delta function of time. The true impulse response function of the space is herein denoted as $r_o(t)$. The waveform of the probing pulse is the point-spread-function that blurs the plot of the true impulse response function into an approximate likeness of it. The true impulse response function $r_o(t)$ of a given space manifests the distances between the reflectors and the transmit-receive point and the intensities of the reflections are indicative of the sizes of and the space rates of change of wave impedance at the reflectors interfaces. There is an understanding that due to dispersive transmission characteristic of the media there may exist modification of secondary significance in an $r_o(t)$.

If the narrow exciting pulse is converted from a narrow electric pulse into mechanical excitation through a transmitting transducer and then coupled to the space and the mechanical wave excited in the space after having propagated through the space to the receiving point is picked up and converted back into electrical signal by a receiving transducer, the impulse response functions of these two transducers cascading with the true response function of the space will modify the overall impulse response function. Let us denote the impulse response of the overall cascade as $r_o'(t)$. When we employ both the receiving transducer and also the transmitting transducer, the impulse response functions of the two transducers are both to be sufficiently narrower than required finest details of $r_o(t)$ so that $r_o'(t)$ can reveal the required finest details of $r_o(t)$. In the text to follow, for the sake of referral convenience, let us for the moment assume that $r_o'(t)$ is equal to $r_o(t)$. The effects of the impulse response functions of the transducers on modification on $r_o(t)$ to become $r_o'(t)$ will be given attention to whenever necessary.

The concept of a true impulse response function of a space is naturally and readily generalized to all signal propagation probing problems where there are ray paths of all kinds (paths of direct transmission, refraction and reflection) between the transmitting point and the receiving point with the transmitting point and the receiving point being not necessarily at the same location.

It is the goal of all to procure a likeness of $r_o(t)$ that can best approximate the true $r_o(t)$. The goal demands that we are to make the excitation as narrow as possible to achieve higher resolution. The resolution of a likeness of $r_o(t)$ is a measure defining how refined the details of $r_o(t)$ can be discerned in the likeness.

To procure a useful likeness of $r_o(t)$ in a noisy probing environment there is required an adequate amount of excitation energy. When the excitation pulse is to be narrow, the time rate of release of energy of excitation has to be high. Due to engineering practicing limitations in releasing an adequate amount of excitation energy in a sufficiently short interval, people invoked to the so-called pulse-compression technique, using which the required amount of energy can be released in an elongated time duration.

When a signal is filtered by its matched filter, the signal is reshaped into its auto-correlation function (acf) by the matched filter. The traditional (conventional) pulse-compression technique is based on a fact that for some deliberately designed wideband finite duration signals, the acfs of which have compact central (core) parts that are much narrower than the signals themselves. The time-bandwidth product of the narrow central (core) part of the acf of a signal having such a property is of the order of unity. Such signals are said to be compressible and their respective matched filters are called their respective compressing processors. The acf of such a signal can be called the compressed version of the signal; here a matched filter is used for compressing the compressible signal.

Let us herein denote the general probing signal as x(t). The impulse response function of the matched filter, which is the mirror image of the signal x(t) within a constant multiplier, is x(−t). The acf of x(t), which is therefore x(t)*x(−t) within the same constant multiplier, is denoted $acf_x(t)$. (All in time domain representations.) People want to find signals the center (core) part of whose acf can be slim. Only some sophisticatedly designed signals are compressible by their matched filters.

When the space to be probed is linear, after sending a long compressible signal into the space, collecting the received signal from the space, and processing the collected received signal by the signal's matched filter, what one eventually procures is an output which is the response of the space to an equivalent excitation. The equivalent excitation is the signal after being processed by its matched filter: the acf of the signal. It is the compressed version of the signal.

FIG. 1 explains the notion of the equivalent excitation. FIG. 1-a shows a matched filter probing system in its physical layout: The space which has a true impulse response function $r_o(t)$ (102) is excited by the probing signal x(t) (101). The response of the space to x(t) is x(t)*$r_o(t)$ (104), and it is processed by the matched filter x(−t) (103). The output (104) of the matched filter is therefore $$[x(t)*r_o(t)]*x(-t) = [x(t)*x(-t)]*r_o(t) \quad (1)$$
$$= acf_x(t)*r_o(t),$$

where * stands for convolution operation. From the above expression it is seen that the output of the system is the response of $r_o(t)$ to $acf_x(t)$ which lends itself to playing the role of an EQUIVALENT EXCITATION which excites $r_o(t)$. In FIG. 1-b, relative positions of the space (102) and the matched filter (103) are interchanged relative to that shown in FIG. 1-a. Due to linearity of the space (102) and the matched filter (103), one has the output (104) of FIG. 1-b the same as the output of FIG. 1-a. And FIG. 1-c is the equivalent of FIG. 1-b; in FIG. 1-c, it is shown that the space (102) is excited by an equivalent excitation which is the acf of x(t).

FIG. 1-d is FIG. 1-c with the positions of the block $r_o(t)$ (102) representing the space and the block $acf_x(t)$ (105) representing x(t) compressed by its matched filter interchanged. The output of FIG. 1-d is the same as that of FIG. 1-c. FIG. 1-d shows that the output of a system excited by an x(t) with its output being processed by the matched filter is equal to the output of the system excited by a delta function and post-filtered by a fictitious filter (106) whose time domain characteristic is $acf_x(t)$. The fictitious filter blurs the true impulse response function $r_o(t)$ of the space.

Therefore, when one uses a compressible signal as probing signal and the matched filter of the signal as the compresser, one has:

compressed version of the signal x(t)=equivalent
  excitation=$acf_x(t)$   (2)

with processed output=response of $r_o(t)$ to $acf_x(t)$   (2-a)

or, equivalently, processed output=response of $r_o(t)$ to a delta
  function, post-filtered by $acf_x(t)$   (2-b)

A matched filter matched to the signal x(t) can be implemented as any linear system which has an impulse response function x(−t), or equivalently implemented by using a linear cross-correlator with its signal input channel being driven by the signal and to its reference input channel being fed a reference input which is the exact replica of the signal x(t) with step-by-step relative shifts.

According to Matched Filter Theory, for any signal of a given energy corrupted by a white noise of a given intensity, the matched filter of the signal processes the sum of signal and noise in such a manner that at the peak point of the signal's acf in the output of the matched filter, the signal-to-noise ratio (SNR) is always maximized to a value which is solely determined by the ratio of the energy of the signal and the power spectral density of the white noise.

We must be cognizant of that the probing information carried by $r_o(t)$ is implicit in the waveform of it: $r_o(t)$ is a time-domain entity. Any linear operator interacting with an $r_o(t)$ must be scrutinized of its behavior in the time-domain to see if it brings about loss of probing information carried by $r_o(t)$ in the time-domain: That is, any equivalent excitation that in effect excites $r_o(t)$ and reveals it as processed output, or any filter that is fictitiously attached to the output end of an $r_o(t)$ and reshapes the impulse response of it, must be examined of its functioning in the time-domain. An operation on $r_o(t)$ that may seem good in keeping energy spectral density function of $r_o(t)$ least hurt does not ensure minimization of loss of information implicit in time-domain. The ultimate judgement of the merit of an equivalent excitation or a fictitious filter is therefore if it can best approximate a delta function of time.

Therefore, seemingly people may say that using a signal which is compressible and using the signal's matched filter to process the signal which is corrupted by white-noise, one can have the happy concordance of two desirable processes: one can simultaneously achieve pulse compression and maximization of SNR at the peak of the processed received signal output.

According to the convolution theorem, when a system is excited by a sufficiently narrow pulse which is narrow enough to reveal the refined details of the system impulse response function, the response of the system to the narrow pulse will approximate the true impulse response function of the system multiplied by the area of the narrow pulse. The slimmer the narrow pulse, the better the response resembles the true response function of the system.

Therefore, if the acf of a compressible probing signal used can be made to asymptotically approach a delta function, the response of $r_o(t)$ to the signal after being processed by its matched filter will correspondingly asymptotically approach $r_o(t)$ of the space multiplied by the area of the slimmed acf. That is, we have, processed output of the system→ $[acf_x(t)dt]r_o(t) =$ (3)

[area of $acf_x(t)]r_o(t)$ when width of $acf_x(t)$ tends to be narrower and narrower. This is the philosophy of the pulse-compression approach of procuring a good likeness of $r_o(t)$ by using a compressible long signal and its matched filter.

One can conclude at this point that the key to achieving good performance of pulse-compression approach of estimation of travel times is to find compressible probing signals whose acfs can approach the delta function. People of the detection-ranging profession have been constantly attempting to find compressible signals whose acfs can well approach the delta function.

Regarding the issue of attempting to make the acf of a compressible signal asymptotically approach a delta function of time, we have the following remarks:

A delta function is the limit of a pulse function of a fixed finite area (say, unity area) when the pulse function is time-wise squeezed to make its width tend to zero.

According to Fourier Transform Theory, the area of the acf of a signal is equal to the intensity of the energy spectral density of the signal at zero frequency. Consequently, if the energy spectral density of a signal at zero frequency is zero, the area of the acf is zero.

According to the Matched Filter Theory, the intensity of the acf of a signal at the peak point of it is proportional to the energy of the signal. It is fixed when the energy of the signal is fixed.

3. The Prior Art and Disadvantages of the Prior Art: "Shackled" Resolution, Poor Signal-to-Noise Ratio, and the Side-Lobe Problem The first finite duration compressible signal conceived by electrical engineers and used in engineering applications was the sweep frequency signal called chirp. It is still the most popular probing signal in use. Pulse-compression probing methods using the chirp as the probing signal is the typical representative of the prior art of pulse compression technique. An example of the auto-correlation function of a chirp is shown in FIG. 2. Being even-symmetrical, it has a central main lobe and a cluster of strong side-lobes flanged around the main lobe. One may have an impression that the sum area of positive lobes and the sum area of the negative lobes of the acf look equal. People had been hoping that the acf of the chirp could have a waveform which could asymptotically approach a delta function. People also hoped that the acf of a chirp could be tuned to contain no protruding sidelobes.

Regretfully, the acf of a chirp cannot be made to asymptotically approach a delta function and the sidelobes of the acf of a chirp are inevitable.

Chirp is a bandpass signal whose energy spectral density at zero frequency can be said to be always zero because the low-frequency end of the sweep cannot reach zero frequency. The energy spectral density function of a linearly swept chirp swept slowly enough almost agrees in shape with the rectangle spanning over the scope of the sweep. Accordingly, one can say that the area of the acf of a chirp is always 'zero'. Therefore, the acf of a chirp cannot be made to approach a delta function since it has a 'zero' area, and the rippling sidelobes of the acf of a chirp signal are inevitable since there must be ringing side-lobes to add up with the main lobe to a sum which can only be 'zero'. To be more specific, as the acf of a chirp is a cluster of ringing lobes compacted around its main or central lobe, the sum area of this core part of the acf compacted around its center is always substantially zero. That is to say, when using chirp as a probing signal, and when the chirp is designed to make the core part of its acf narrow, one has to take into consideration the fact that the area of the core part of the acf is substantially zero. The time width of the main lobe of its acf is of the order of the reciprocal of the frequency sweep width of the chirp and is adjustable by tuning the frequency sweep width. However, making the main lobe (and hence the core part) of acf slim cannot make the acf asymptotically approach the delta function. Therefore, when the signal chirp used to excite the space is so designed that the width of the main lobe of its acf is slim enough for revealing the details of $r_o(t)$, although the response of the space to the chirp after being processed seemingly "may" asymptotically approach $r_o(t)$ in waveform, the INTENSITY of the response inevitably "will" tend to vanish since the area of the acf is 'zero' (see Eq.(3)). Consequently, using the signal chirp, there is a limitation that one cannot achieve high resolution.

We can have a complementary explanation to such a situation by using time-domain interpretation. As the acf of the chirp is a slimmed pulse composed of a COMPACTED CLUSTER of ringing lobes which sit close to each other, the equivalent excitation of a system using the chirp and its matched filter has its different component lobe excitations deployed close to each other in time. The response of $r_o(t)$ to the different lobes of the acf would therefore tend to offset each other due to the proximity of the alternately signed different lobes and due to that the areas of the lobes add to zero. The offsetting is more deteriorating for the slower changing components of $r_o(t)$. It is clear that the narrower the whole piece of the acf is, the more refined details of $r_o(t)$ is hoped to be revealed, but the closer the different lobes will be with each other and the offsetting in the general response will correspondingly be more nullifying. Therefore, a probing system using a chirp together with its matched filter has the INBORN WEAKNESS that it cannot ultimately achieve desirable resolution when the energy of excitation is limited. If one wants to use the chirp to achieve a good resolution by designing the signal to make its acf narrow, one has to pay the penalty of greatly increasing the energy of the signal to compensate for the loss of the output due to off-setting of the different lobes of its acf. If, on the other hand, the acf of the chirp is not made to be very narrow, the offsetting will be less nullifying, but the resultant response of $r_o(t)$ to the acf (the equivalent excitation) will be a superposition of responses to its differently positioned blunt lobes. Consequently, the resultant general response can only be a very much distorted likeness of $r_o(t)$. Even so, due to that the areas of the different lobes add to zero, one still has to pay the penalty of greater excitation energy to obtain the much distorted and yet feeble likeness of the true impulse response function of the space. This is the realistic quality of probing systems using the signal chirp.

We can view the zero area problem of the acf of a chirp as that it tends to UNDERMINE the effectiveness of excitation of the probing signal when one attempts to make the processed output better resemble $r_o(t)$ for better resolution even though the composite received signal actually reaching the receiving site has a strong intensity: When $r_o(t)$ has crowded spikes, the composite received wave is processed by the matched filter into so odd a wave that it tends to cancel itself when one tries to tune the chirp for better resolution. Such a mechanism of limitation to achieving resolution can be figuratively called SHACKLING OF RESOLUTION due to the zero area problem of the chirp. To compensate for such shackling of resolution, the energy of the signal is "extorted" to be greatly increased. It is unfortunate for the signal chirp that, although the acf of it is compressible, the cluster of the lobes of the compacted acf has a sum area which is substantially zero.

All bandpass probing signals that have compact acfs with compacted clusters of rippling lobes have in common the problem of acf area self-offsetting due to diminished energy spectral densities at zero frequency. They all have the difficulty in achieving resolution at an un-extorted excitation energy level.

Historically, pulse-compression reflective probing using the signal chirp as probing signal and its matched filter as compressing processor was contemplated simply for probing spaces containing only thin reflectors that are very sparsely separated. In such cases one does not have the need for a really narrow and single-lobed acf. What people primarily concern about is if they can detect the presence of the sparsely separated thin spikes with maximized SNR and can thence well estimate/locate the time positions of the thin spikes. In such cases the signal chirp works unblemishedly in spite of that its acf has out-stretched flange and side-lobes and that the area of the acf is zero.

However, when there are spikes crowded together or blocks of merged up spikes in $r_o(t)$ (for example, in reflection cases, when there are crowded reflectors such as it is in the case of geophysical exploration, or when there are slanting reflectors of large longitudinal sizes), there would be the requirements that the acf of the signal SHOULD BE NARROW ENOUGH, does not have side-lobes, and that the area of the acf does not equal to zero. An out-stretched flange with side-lobes will obscure the discernibility of the individual spikes and make the desirable optimal SNR quality of the matched-filter pulse-compression method badly invalidated: There will be garbling of the true impulse response function and SNR degradation. These are due to that the icons of the acfs due to neighboring spikes in $r_o(t)$ will mutually smear. Mutual smearing gives rise to garbling (mutual masking) of the different icons of the acfs pertaining to neighboring spikes in $r_o(t)$, and SNR can no longer be maximized because of the randomness of mutual smearing due to out-stretched flanges of icons of neighboring acfs of random strengths. The more densely the individual spikes of $r_o(t)$ of the space are crowded, the more acute will be the mutual masking of the icons of the acfs of neighboring spikes of $r_o(t)$ and the more forbidding will be the degradation of SNR.

Therefore, when $r_o(t)$ has crowded spikes, not only the zero-area problem would harm SNR and shackle resolution, but also the side-lobes and out-stretching flanges of the acf would incur garbling of $r_o(t)$ and degradation of SNR due to mutual smearing of the neighboring spikes of $r_o(t)$.

As a typical example, in the case of seismic geophysical prospecting, the spikes in $r_o(t)$ are often so densely crowded that they form a continuum. There are superposed slow and fast ups and downs in $r_o(t)$s. In such cases, a probing system using the chirp and its matched filter CAN NEVER achieve desirable resolution and SNR performances in any sense due to the reasons explained above.

Here, we can have a comment on the problem of limited resolution performance of the chirp and matched filter method in seismic geophysical exploration cases. According to the above, it is chiefly the problem of "shackled resolution" which is in force that limits resolution: When people boost the high frequency end of the chirp signal to attempt accomplishing better resolution, people go more entangled in the zero area problem of its acf. Unfortunately, it has been mis-judged that the limited resolution achievable in employing the chirp and matched filter method in seismic geophysical prospecting is due totally to the limitation to transmission of probing signal at high frequency end of the passband of the earth. As a matter of fact, using very large number of small dosage dynamite detonation excitations of slimmer width and stacking the very numerous feeble received waves, people have succeeded in obtaining the likeness of an $r_o(t)$ with relatively satisfactory resolution. The small dynamite dosages imply slimmer excitation pulses. They carry high frequency probing signal components, and they characterize relative freedom from out-stretched flanges and rippling side-lobes which the acf of chirp signal has. It is the high frequency components of the small dosage detonations that help upgrade resolution. Although the high frequency end of the passband of the earth does attenuate high frequency components of the probing signal, a slim excitation does let reflections better tell the true story of the transmission medium. From such a fact we can appreciate the importance of getting rid of the zero area problem of the acf of a probing signal when $r_o(t)$ has crowded spikes that merge up. For the case of seismic geophysical exploration using method with chirp as probing signal and its matched filter as compressing processor, when it is needed that desirably high resolution be achieved, the needed increase of probing energy can be tremendously great such that the transmitting transducer is colossally bulky, and such a need for giant transmitting transducers has currently become a forbidding stumbling block to wider employment of the conventional probing method using chirp/matched filter. On another side, the increase of probing energy suggests the probed space/object is over-agitated than it actually is needed to be energized, and this is not desirable at all.

Now one sees the unhappy and gloomy aspects of the probing method using the signal chirp with its matched filter: compelling side-lobes, inborn low SNR, and doomed poor resolution, when the spikes of arrivals in $r_o(t)$ are not sparse and not thin.

More, when the background noise is non-white, the matched filter, which has for its impulse response function the image of the probing signal, cannot process the signal plus noise to attain a maximized SNR at the peak points of the processed output even if the spikes in an $r_o(t)$ are sparsely scattered and thin.

Readers interested in the chirp signal and matched filter method are referred to, for example, J. R. Klauder et al: Theory and Design of Chirp Radars, Bell System Technical Journal, vol. 39, pp 745–808, July, 1960. The reader is also referred to P. L. Goupillaud: Signal Design in the Vibroseis Technique, Geophysics, vol. 41, pp 1291–1304, 1976.

4. A Simple Approach to a New Horizon

Workers of the pulse-compression detection-ranging profession have been very diligent in attempting to find finite duration compressible signals whose acfs can be narrow, without side-lobes, and can approach the delta function really well. Of course people also want the matched filters of such signals to be capable to effectively suppress background noise when it is non-white. Regretfully, none succeeded.

Aiming at eliminating side-lobes, some workers of the seismic geophysical prospecting industry had been attempting to make use of the property of being free from side-lobes of the acfs of CYCLICALLY REPETITIVE m-sequences in designing good finite duration probing signals. Some aspired that the acf of a finite duration signal formed by coding BANDPASS pulses by a single period m-sequence might be tuned to be free from side-lobes. Again regretfully, none succeeded. They all used the matched filter to reshape the probing signal into its acf for pulse-compression: They all used the REPLICA of the probing signal as reference signal to obtain the signal's auto-correlation function which plays the role of equivalent excitation. Basically, they used a single period m-sequence to code a sinusoid/cosinusoid to form the finite duration probing signal wherein the bit duration of the m-sequence had to be an integral multiple of the period of the sinusoid/cosinusoid while the frequency of the sinusoid/cosinusoid was to be located in the middle portion of the earth's apparent bandpass transmission passband. Since the auto-correlation function (acf) of a single-period m-sequence cannot be free from side-lobes, the side-lobe elimination problem could not be resolved as desired. Since the acf of a sinusoid/cosinusoid coded by an m-sequence whose bit duration is limited to be no narrower than the inverse of a frequency which is located in the midband of the earth's transmission passband and cannot be high, the central (core) part of the acf cannot be made narrow and hence resolution problem and mutual smearing problem in seismic geophysical prospecting could not be resolved. Since the energy spectral density function of coded band-pass wavelet strings can only have very much diminished intensities at zero frequency, the problem akin to the zero-area problem explained above could not be escaped and hence the methods could only achieve poor SNR at un-exaggerated excitation energy levels and "shackled" resolution. Since in seismic geophysical prospecting the background noise picked up at the receiving site is always non-white and has a pass-band which often closely coincides with the pass-band of the probing signal, the background noise cannot be effectively filtered out by the processing filter. As a result, the performance of their methods had proved to be practically no better than the currently prevalent method of using chirp as signal and its matched filter as the compressing processor, and could not come in to popular use. A representative report on field experience of said attempts can be found in A. B. Cunningham: Some Alternate Vibrator Signals, Geophysics, Vol. 44, p. 1901 ff, N°. 12, December, 1979. Other typical examples of finite duration probing signals attempting to apply m-sequence to signal design in seismic geophysical applications can be found in U.S. Pat. No. 3,264,606 to T. N. Crook et al, and U.S. Pat. No. 2,234,504 to C. R. Wischmeyer.

Fortunately, by using a LOW-PASS wavelet in place of using a BAND-PASS wavelet as the elementary wavelet of the string of wavelets which are amplitude-coded by the single period of the m-sequence in the probing signal, by using a special reference signal which is based on a cyclical repetition of the same m-sequence in place of using the simple replica of the probing signal as the reference signal, and by insightfully exploiting the working principle of the above stated method using the attributes of m-sequence by trickily imposing a TEMPORAL-NARROWNESS REQUIREMENT on the parameters of the probing signal, all the undesirable drawbacks of the conventional pulse-compression probing methods are removed. INTERESTING ENOUGH, based on an unobvious but sound rationale, the POWER RATING of the transmitting tranducer can be REDUCED when the special temporal-narrowness requirement on the probing signal parameter is met.

By making the above changes in probing signal design and reference signal formation, the equivalent excitation can be made to be free from zero-area problem, DESIRABLY and NOTABLY SLIM, free from outstretching flanges, and free from side-lobes, and we come up to the method of the invention. As consequences of having the many drawbacks of the conventional method of pulse-compression remedied as based on the above listed qualities, the method of the invention features greatly upgraded resolution, greatly enhanced SNR, notably extended effective probing range, freedom from garbling of $r_o(t)$, relief from need for increased excitation power/energy for upgrading resolution, and in addition, the feasibility of using transmitting transducers of lighter weight when the temporal-narrowness requirement is met. The method of the invention also has the capability of minimizing processed background noise when the original background noise is colored. The method of the invention is time-economic in field data aquisition and processing computation.

We will see that the method of the invention opens a door to a new horizon. The method of the invention does not require sizable new equipment to be built, and its performance has been field tested and reported (without disclosing the method) in Hong-Bin Chen and Neng Eva Wu: A New Result in the Method of Seismic Data Acquisition, Society of Exploration Geophysicists (SEG) Annual Meeting Expanded Abstract Book, 1988, Anaheim. The reported results fully substantiate theoretical prediction. The reported results advocate that meeting the temporal-narrowness requirement will result in achieving expected performances. The mechanisms that achieve the many improvements will be explained in the SUMMARY OF THE INVENTION and THE DETAILED DESCRIPTION OF A PREFERRED EMBODIMENT OF THE INVENTION in the text to follow.

SUMMARY OF THE INVENTION

1. The Improvements (1). Elimination of the side-lobes problem.

(2). Greatly enhanced resolution.

(3). Greatly upgraded SNR and hence remarkably extended probing range at the same excitation energy level.

(4). Feasibility of employment of transmitting transducers of greatly reduced power rating to excite the space to be probed to eventually obtain valid useful processed output at unreduced intensity and very high resolution.

(5). Greatly reduced intensity of being agitated of the space to be probed at unreduced intensity of processed output.

(6). Time-economy in processing.

2. The Method of the Invention (1) General

The method of the invention aims at remedying the drawbacks of conventional pulse-compression probing method that employs BANDPASS probing signal (typically the chirp) to achieve greatly upgraded resolution, greatly enhanced signal-to-noise ratio (SNR), greatly extended effective probing range, greatly reduced required power rating of transmitting transducer, and processing time economy. The method of the invention does not require supplanting major equipment currently employed in the popular conventional pulse-compression probing method using signal chirp.

The method of the invention uses a finite-duration compressible probing signal x(t) which is formed of a string of wavelets of a pulse waveform p(t) amplitude-coded (polarity-controlled) by a single period m-sequence. The wavelet p(t) has a LOW-PASS waveform and has a slimness commensurate with or even MUCH NARROWER than the required finest details of $r_o(t)$. A special choice of p(t) is to choose the width of p(t) slimmer than the required finest detail of $r_o(t)$. The probing signal x(t) is transmitted into the space through a transmitting transducer, and a composite received signal denoted as y(t) which carries the information of the times of travels along the multiple ray paths is collected through a receiving transducer at a receiving point together with the background noise denoted $n_i(t)$. The combination of the composite received signal and the noise, $[y(t)+n_i(t)]$, called total collected wave (data), is processed by cross-correlating it with a special reference signal s(t) which is nominally endlessly cyclically repetitive. s(t) is formed by using the cyclical repetition of the same single period m-sequence in x(t) to polarity-control a string of lowpass wavelets of waveform q(t). Repeating cross-correlation operation at a sufficiently many relative shift positions, one obtains the cross-correlation function of the collected data and s(t). The cross-correlation function is cyclically repetitive at the same period of the m-sequence. A single period of the cross-correlation function is used as the end result of the process of the method of the invention. It is a likeness of $r_o(t)$ and can be made a very good likeness of $r_o(t)$ by properly choosing the widths of p(t) and q(t) and also the widths of the impulse response functions of the transmitting and receiving transducers.

A required q(t) is chosen for improving the processed output signal-to-noise ratio (SNR). However, a special but general choice of the waveform q(t) is to choose it to be a delta function of time. In so choosing, cross-correlation operation on collected data by s(t) turns out to be degenerated into simple sampling of the collected data by the cyclically repetitive m-sequence in $\{+1,-1\}$. Turning the process of cross-correlation operation into polarity-sampling implies simplicity and computing-load saving. Choosing the delta function of time as q(t) is called using the basic version of the reference signal s(t), and correspondingly choosing q(t) a delta function of time is called using the basic version of q(t). When there is needed a required q(t), we can use the basic version q(t) in s(t) for processing for the first step, and then the first step processed outputs can be further filtered by a filter of impulse response function q(−t) to finally obtain the required outputs as the second step. The compressed version (the equivalent excitation) of the signal for the non-basic version case is equal to the compressed version (the equivalent excitation) for the case of the basic version modified by convolving it with q(−t). In the text to follow, we will be mainly dealing with the basic version except when a required waveform of q(t) is cited.

In the text of the Application, let us take referring to a single period excerpt of a cyclically repetitive m-sequence and a single period m-sequence the same.

(2) The Single Period m-Sequence Compression Mechanism and the Side-Lobes Elimination Feature It is known that the acf of a cyclically repetitive m-sequence in $\{+1,-1\}$ exhibits the properties of:

1. It is cyclically repetitive; the period of repetition is same as the period of the m-sequence.

2. It has, in each repetition cycle (period), a unique positive spike formed by assigning same positive signs to, lining up, and stacking up ALL elements in a single period of the m-sequence.

3. It has, at the remaining positions of a single cycle (period) of the acf, a background setting formed of constant intensity negative pips. The intensity of every pip equals the negative of the algebraic sum of all elements in a single period of the m-sequence; none of the background pips protrudes.

It suggests that one may say that each cycle of the cyclically repetitive acf of the cyclically repetitive m-sequence is a compressed version of one period of the cyclically repetitive m-sequence.

Based on alike mechanism and same reasoning, the cross-correlation function of a cyclically repetitive m-sequence in $\{+1,-1\}$ with a reference sequence, which is a single cycle of the same m-sequence, is equal to the acf of the cyclically repetitive m-sequence in $\{+1,-1\}$ quoted above. This has been a well known property of the m-sequence.

In the operation for obtaining the cross-correlation function, let us call the sequence to be processed as the operand of the operation, and the reference sequence as the operator of the operation. In the operation for obtaining the cross-correlation function quoted in the above paragraph, the cyclically repetitive m-sequence is the operand, and the single cycle of the same m-sequence is the operator.

And let us refer to the operation for obtaining the cross-correlation function as the cross-correlation-function operation ON the operand BY the operator.

Since the roles of the operand and the operator participating in a cross-correlation function operation are COMMUTATIVE, one can take the single period excerpt of a cyclically repetitive m-sequence in $\{+1,-1\}$ as the sequence to be compressed and the same cyclically repetitive m-sequence in $\{+1,-1\}$ as the reference sequence and obtain the same cross-correlation function. Thus, we can compress a single period excerpt of an m-sequence without having to suffer from having protruding side-lobes. The processor is not a matched filter of the sequence to be compressed. It is a cross-correlator with a special reference sequence which is NOT the REPLICA of the single period m-sequence to be compressed but is the CYCLICAL REPETITION of the single period m-sequence. The compressed output is not the acf of the sequence to be compressed but is the cross-correlation function of the sequence to be compressed with its cyclical repetition. Although in so doing the cross-correlation function is cyclically repetitive, the cyclical repetition is a superfluous redundancy and may be discarded at will without loss. The method of the invention exploits the idea of compressing a single period m-sequence explained above to achieve forming finite duration compressible probing signal and compressing it by cross-correlation operation into a compressed output without having the side-lobe problem.

We may, instead of using the single period m-sequence in $\{+1,-1\}$ as operand, use a single period m-sequence in $\{+1,0\}$ as the operand. It can be easily shown that after cross-correlation operation by the same operator as that explained above, one will obtain a compressed output (the cross-correlation function) without side-lobes characterizing a unique positive spike encompassed in an all flat background without negative pips, in a single period.

Be reminded that if we perform cross-correlation-function operation ON a single period of an m-sequence in $\{+1,-1\}$ BY the same single period of the m-sequence in $\{+1,-1\}$ ITSELF, it will end up in the auto-correlation function of the single period excerpt of the m-sequence which characterizes having a single stacked spike encompassed in a cluster of protruding side-lobes.

The m-sequence is generated in compliance with a pre-chosen primitive polynomial. If the order of the primitive polynomial used for the generation of the m-sequence is n, the number of elements in a single period of the m-sequence is $L=2^n-1$, the intensity of the stacked spike of the acf in a single cycle (period) is L, and the constant intensity of the even background setting pips of the acf in a single cycle (period) is $-1$. Readers interested in m-sequences are referred to W. W. Peterson et al: Error Correcting Codes, Appendix C, MIT Press, Cambridge, Mass., 1972, and S. W. Goulomb: Shift Register Sequences, Chapter 3, Holden-Day, Oakland, Calif., 1967.

(3) The Principle of Compressing a Single-Period m-Sequence Controlled String of Wavelets and the Principle of Pulse-Compression Probing of the Method of the Invention Using the method of compressing a single period m-sequence as explained in section (2) above, a method of compressing a finite duration signal wave into its compressed version which has NO SIDE-LOBES can be readily concocted. If the space to be probed can work in LINEAR mode, such compressible signal wave can be used as probing signal to probe the space, and the received wave is processed to yield the wanted informative output as the result of probing task as if the space is probed by the compressed version of the probing signal. This is the principle of pulse-compression probing.

Let us use the elements of a single period (cycle) of a clock-timed cyclically repetitive m-sequence to amplitude-code (for example, to polarity-control) the elements of a string of wavelets of a pre-chosen waveform p(t) (p(t) is to be a low-pass wavelet in the method of the invention) to form the signal to be compressed. And let us use a special reference signal to cross-correlate with said signal at dense enough relative positions to obtain a special cross-correlation function which is the cyclical repetitive compressed version of the signal. The special reference signal is a cyclically repetitive string of low-pass wavelets of a waveform q(t) polarity-controlled by the same clock-timed cyclically repetitive m-sequence. If the two m-sequences are supplied separately, they have to be somehow INTERLOCKED/SYNCHRONIZED.

Designating the compressible probing signal as x(t) and the reference signal as s(t), the cross-correlation function is [x(t) x s(t)]. Let [x(t) x s(t)] be denoted e(t). The symbol x is used to represent cross-correlation-function operation. Let us investigate the case when x(t) is a (finite duration) string of p(t)s polarity-controlled by a single period of a clock-timed m-sequence in $\{+1,-1\}$ and s(t) is a cyclically repetitive string of q(t)s (q(t) is to be a low-pass wavelet in the method of the invention) polarity-controlled by the same clock-timed cyclically repetitive m-sequence in $\{+1,-1\}$.

e(t)=[x(t) x s(t)] is equal to [p(t) x q(t)] polarity-controlled by the cross-correlation function of the single period m-sequence in $\{+1,-1\}$ with the cyclically repetitive m-sequence in $\{+1,-1\}$. [p(t) x q(t)] is equal to [p(t)*q(−t)]. Here, the symbol * stands for convolution operation. The cross-correlation function of the single period m-sequence with the cyclically repetitive m-sequence is the cyclical repetitive compressed version of the single period m-sequence, and hence e(t)=[x(t) x s(t)] is equal to [p(t) x q(t)]=[p(t)*q(−t)] polarity-controlled by the cyclically repetitive and clock-timed compressed version of the single period m-sequence. The compressed version of a single period m-sequence cyclically repeats at the period of the m-sequence. Based on that in each cycle of the cyclical repetition of the compressed version of the single period m-sequence there is a unique spike of intensity +L encompassed in a background of (L−1) pips of constant intensity −1, an x(t) which is formed of p(t)s polarity-controlled by a single period m-sequence can be compressed into a cyclically repetitive compressed version of said x(t) which is e(t). Each cycle of the compressed version of x(t) is formed of a unique spike of waveform L[p(t)*q(−t)] encompassed in a background of (L−1) constant intensity pips of waveform −[p(t)*q(−t)] without any protruding side-lobes.

When the basic version of s(t) is used, the positive spike in e(t), L[p(t)*q(−t)], equals Lp(t), and the balance background part of e(t), which is a string of −[p(t)*q(−t)]s, is a string of −p(t)s.

The composite received signal at the receiving site is y(t)=[[x(t)*$r_o$(t)], where $r_o$(t) is the impulse response function of the space. When the space to be probed is linear, the cross-correlation of y(t) with s(t), [x(t)*$r_o$(t)]x s(t), is equal to [x(t) x s(t)]*$r_o$(t); it is the response of $r_o$(t) to [x(t) x s(t)]:

$$[x(t)*r_o(t)] \times s(t) = [x(t) \times s(t)]*r_o(t).$$

Note that e(t)=x(t) x s(t)], the COMPRESSED-VERSION of x(t), plays the role of an EQUIVALENT-EXCITATION which excites the space whose impulse response function is $r_o$(t): We have the equivalent excitation being equal to the compressed version of x(t), which is e(t). Again, the equivalent excitation is cyclically repetitive and the period of repetition is the period of the m-sequence.

As a matter of fact, the true job of the cross-correlator is to sort out the individual responses of $r_o$(t) to the individual elementary p(t) wavelets in x(t) to allot them the same sign, to line them up in time, and then to bunch them up to yield a perfect accumulation. It is by exploiting the linearity of the space that the processed output of probing can be equivalently determined by taking it as the response of $r_o(t)$ to the compressed-version of $x(t)$; the cross-correlator does not directly compress $x(t)$.

Although the equivalent excitation $e(t)$ is cyclically repetitive so that the response of $r_o(t)$ to $e(t)$ is likewise cyclically repetitive, the repetition does not hurt. The redundant repetition can be ignored, and does not need to be redundantly computed if so desired.

Now, we can draw a primary parallel between pulse-compression probing using the method of the invention and that using the conventional matched filter method in order to better see the difference between the two methods.

What are in common for both methods are:
1. The notion of compressed versions of the probing signals or equivalently the notion of equivalent excitations of the probing method, and
2. That cross-correlators are used to reshape the probing signals into their compressed-versions/equivalent-excitations in both methods.

The substantial differences between the procedures of practicing and results of the two methods are:
1. The reference signal used in conventional method is the replica of the probing signal itself and is not cyclically repetitive, while the reference signal used in the method of the invention is not the replica of the probing signal and is cyclically repetitive.
2. The compressed-version of the finite duration probing signal of the conventional method (the equivalent-excitation of the conventional method) is the acf of the probing signal; it ALWAYS has protruding side-lobes and is not cyclically repetitive. In contrast with this, the compressed version of the probing signal of the method of the invention (the equivalent excitation of the method of the invention) is NOT the acf of the probing signal; it does NOT have any protruding side-lobe and is cyclically repetitive.

It is clear from the above that, based on the correlation property of the m-sequence, the method of the invention must at least outperform the conventional method in that the method of the invention DOES NOT HAVE the problem of SIDE-LOBES in the compressed version of the probing signal. The difference in side-lobe problem performance owes to that the signals used in the two methods are different and that the reference signal used are different.

Besides elimination of the sidelobes, there are also differences in performance in the aspects of resolution and signal-to-noise ratio (SNR) and they can be made VERY GREAT. Primarily, the great differences are due to that the conventional method has big drawbacks that degrade resolution and SNR. As explained in the BACKGROUND part of the Application, we set an ultimate goal for the equivalent excitation of a method of pulse-compression probing to reach for remedying the many drawbacks of the conventional method. The ultimate goal is that the equivalent excitation is to be capable of: having no side-lobes (this is achieved as explained above), having no outstretching flanges, and being able to be made slim to asymptotically approach a delta function of time without having zero-area problem. Using the method of the invention, such an ultimate goal can reached. Some performance qualities are surprising when a special working condition requirement called temporal-narrowness requirement of the method of the invention is specifically met.

(4) Direct Controllability of the Equivalent Excitation of the Method of the Invention (Compressed Version of the Signal) in the Time Domain and Resultant Upgrading of Performances In the method of the invention, the waveform of the equivalent-excitation/compressed-version of the probing signal is directly controllable in time domain by the designer of the signal. Possibility of great upgrading of resolution, SNR, and other features (listed in Section (1)) of the method of the invention owes to such controllability. In the conventional method of pulse-compression, for example, in the method using the typical signal chirp, the equivalent excitation CANNOT be directly controlled in the time-domain.

As can be inferred from the discussion (Sections 2 and 3, BACKGROUND) on requirements on the acf (the equivalent-excitation/compressed-version of the conventional method), we recognize that the waveform of the equivalent-excitation/compressed-version of a pulse-probing method is CRUCIAL for achieving many quality performances of the method. Therefore, for quality performances' sake, we need to CONTROL the WAVEFORM of the compressed-version/equivalent-excitation and make it free from SIDE-LOBES (and out-stretched flanges), free from the ZERO-AREA problem in its core part, being ready to be made SLIM for upgrading of RESOLUTION and enhancing of SNR when there is crowding of neighboring spikes in $r_o(t)$, and being feasible to be made SLIM ENOUGH for achieving some OTHER performance features to be discussed and explained later in section (8).

The problem of getting free from side-lobes has already been discussed and solved in (3) as based on (2). In this section, we are going to put emphasis on the issue of using direct controllability of equivalent excitation to seek freedom from the zero area problem and based upon that to achieve high resolution without need for increased excitation energy by escaping the problem of "shackled-resolution".

It can be seen that in the method of the invention, the waveform of the equivalent excitation is readily controllable to make the core part of it free from zero area problem. Also, it can be controlled to be as narrow as one desires. It can be additionally seen that in the method of the invention when we control the width of the core part of the equivalent excitation to be without zero area problem and narrow enough, we can secure a processed output $z(t)$ whose waveform and intensity are invariant of the controlled narrowness of the core part of the equivalent excitation provided T and energy of an $x(t)$ are kept fixed. More, we will further see a non-zero-area and narrow enough core part of equivalent excitation can lead to feasibility of valid probing by using reduced power rating transmitting transducer (and also state of being less energized of the probed space/object).

To be free from the zero area problem has been a long-time ignored and very important problem to be solved for upgrading performance of pulse compression method, and no counter-measure against it has ever been attempted to be sought so far. The fact that using the method of the invention employing a narrow enough equivalent excitation can lead to feasibility of employing transmitting transducer of REDUCED power rating for VALID probing has never been contemplated in the community of the probing art before.

Let us discuss the present topics based on using the basic version of q(t) in the s(t) defined in section (1) above. According to section (3), when using the basic version of q(t), what one obtains for an equivalent excitation/compressed version is a cyclical repetition of a time function passage which contains a unique spike Lp(t) encompassed in a background setting of a string of −p(t)s evenly distributed over the balance of the period. The unique spike Lp(t) is the core part of the equivalent excitation/compressed version. As p(t) is readily tailorable to assume a desired waveform in time domain, accordingly Lp(t) is DIRECTLY CONTROLLABLE in time-domain. Therefore, in order to make the core part of the equivalent excitation free from zero area problem, we can simply CHOOSE p(t) a LOWPASS wavelet so that the spectral density of p(t) at zero frequency is not zero and hence the area of p(t) and also the area of Lp(t) are not zero, and the zero area problem is eliminated. Examples for a p(t) to be a lowpass wavelet are, a rectangle, a raised cosine, and other non-oscillating pulses. (Choosing a rectangle as p(t) has the convenience in circuitry implementation, and choosing a raised cosine as p(t) has the advantage of making time-bandwidth product of an x(t) economic since a raised cosine wavelet is a simple and good approximation to a Gaussian function.)

In contrast with the direct controllability of the equivalent excitation in time domain in the method of the invention, in the typical conventional method which employs the typical signal chirp together with its matched filter, the design of a probing signal is done in the frequency domain. The compressed version of the signal chirp (or, the equivalent excitation; it is the acf of the signal) is the inverse Fourier transform of the energy spectral density function of the signal designed in frequency domain. The waveform of the equivalent excitation (acf) is therefore not under control in the time domain by the designer. As a consequence, it cannot be free from out-stretched flanges and side-lobes in time-domain sense, and its core part cannot be free from the zero area problem since chirp is a bandpass signal.

It is clear that a wide p(t) (and hence a wide Lp(t)) is one of the causes that blur $r_o(t)$. Making the width of p(t) narrow enough and free from out-stretching flanges will relieve blurring due to p(t). This is clearly directly controllable in the method of the invention.

To appreciate the advantage of direct controllability of the waveform of the equivalent excitation in the method of the invention and the significance of choosing p(t) a LOWPASS wavelet which makes the core part of the equivalent excitation free from zero-zrea problem, let us examine FIG. 5-($i$). FIG. 5-($i$) shows the example of an equivalent excitation in the case of using basic version of q(t). Here x(t) (see FIG. 5-($b$)) is a string of rectangular p(t)s whose width is equal to a bit duration of the polarity controlling m-sequence, $t_o$, L being 7 (n=3). Here the duty-cycle, which is the ratio of the effective width of the p(t) to a $t_o$, is set to equal to unity. In engineering practice, L is much greater than such a small number as 7, and $t_o=T/L$ is an accordingly small fraction of T. As a practical engineering example, L=2,047; hence, to=T/2,047. We have to say that what is shown in FIG. 5-($i$) is not drawn to scale as it had better be so for practical cases; it is just for showing what the equivalent excitation would look like and how its waveform is readily controllable, what is the core part of the equivalent excitation, and what would be the area of the core part of the equivalent excitation if duration T of x(t) is fixed and energy of x(t) is fixed.

FIG. 5-($i$) shows that within a single cycle of the equivalent excitation, there is a core part, the unique positive tall spike Lp(t), which is L=7 times a rectangular p(t) in the example. The core part is encompassed in an even background of negative rectangular p(t)s. There are no salient side-lobes. It is seen that as we can readily tailor the waveform of a p(t) (in this example, p(t) is shaped to be a rectangle), the waveform of the equivalent excitation is directly controllable. From FIG. 5-($i$), one can see that the area of the core part of the equivalent excitation is L times the area of a single rectangular p(t). The width of a p(t) is $t_o$. The area of a rectangular p(t) is $t_o$ times the height (say, it equals h) of p(t): $t_o$h. Hence, the area of the core part of the equivalent excitation is $Lt_o$h. If the duration T of x(t) is fixed to make the energy of x(t) fixed, the product $Lt_o=T$ is fixed, and the area of Lp(t), which is $Lt_o$h=Th, is fixed. When $t_o$ is reduced (changed), L is accordingly inverse proportionally increased (changed) while $Lt_o=T$ does not change. We also see that, for T being fixed and the height h of the rectangular p(t) being fixed, the energy of x(t) is fixed and is equal to $Lt_oh^2=Th^2$. That is, we can say, with the duty-cycle fixed, for a fixed T and a fixed energy of x(t), the area of Lp(t), which is L times the area of a p(t), is equal to $Lt_o$h=Th and is fixed and INVARIANT OF $t_o$ (or L). While in this particular example in which p(t) is a rectangle of height h such that the area of the core part of the equivalent excitation is equal to Th and is fixed for a fixed T, generally speaking, for a p(t) of any waveform, with duty-cycle fixed, T fixed, and energy of x(t) fixed, the area of the core part of the equivalent excitation is fixed and is equal to L times the area of a p(t), where the area of a "squeezable/expandable" p(t) is proportional to $t_o$ which is inversely proportional to L, with the product $Lt_o$ being equal to the fixed T. As a result, the processed output, which is a likeness of $r_o(t)$ multiplied by the area of Lp(t), is (practically) invariant of $t_o$ (or L). This is because the processed output is equal to the area of the core part of equivalent excitation times $r_o(t)$ when the core part of the equivalent excitation is narrow enough so that the required finest detail of $r_o(t)$ can be revealed. Here, we see VALID PROBING for acquiring a full processed output is achieved at any choice of the width of p(t) when it is narrow enough. To recapitulate for highlighting, let us decrease $t_o$ or the width of p(t) at a fixed duty-cycle for the purpose of improving resolution. As the area of the core part of the equivalent excitation does not change with decreasing of $t_o$, the value of the multiplier of the likeness of $r_o(t)$, the intensity of processed output, does not change with decreasing of $t_o$. At this stage of understanding the peculiarity of the equivalent excitation of the method of the invention, it can be noted that using the method of the invention, upgrading resolution performance by decreasing the width of p(t) can be accomplished without need for increase of excitation power/energy while it is so for the conventional method.

To see how the remaining part of the equivalent excitation participate in modifying the processed output, let us investigate FIG. 5-($i$) once more. FIG. 5($i$) also shows that the remainder part of the equivalent excitation is a string of negative p(t)s which is largely composed of a d.c. component* (please see note). As a matter of practice, the Fourier transform of an $r_o(t)$ generally has one or more zeros at the origin of the complex frequency plane so that $r_o(t)$ does not respond to a steady d.c. That is, $r_o(t)$ chiefly responds to the core part (the perturbing part) of the equivalent excitation, whose area is invariant of the width of the p(t) chosen, provided $t_o$ is narrow enough, and the processed output practically does not contain the response of $r_o(t)$ to the remaining part of the equivalent excitation.

*As a matter of fact, it is equivalent to say that the whole piece of the equivalent excitation is a combination of two parts: one containing only a unique positive spike which is (L+1)=(7+1) times a rectangular p(t), and the other being a flat string of negative p(t)s: a pure d.c. which is equal to −p(t). There are no protruding elements at all. Generally speaking, in engineering practice, L>>1. Thereupon, the difference between L and L+1 is negligible.

In order to secure raw data acquisition time-economy, the effective width of a p(t) is to be chosen close to a $t_o$ to make the duty cycle close to unity. In the above example, we have the width of a p(t) being equal to a $t_o$ to make duty-cycle equal to unity.

(5) The SNR Improvement Issue

SNR at the output of a probing system using the method of the invention is greatly upgraded relative to what can be achieved when using the conventional matched filter pulse-compression method employing bandpass signals. This is true especially when $r_o(t)$ has crowded spikes (the spikes even form a continuum) and when the background noise is non-white. The mechanisms of upgrading of SNR are:

a. In the method of the invention, the area of the active perturbing part (core part) of the equivalent excitation can be readily made to be FREE FROM ZERO-AREA PROBLEM. This is the principal mechanism for improving SNR.

Recall that in the matched filter pulse-compression method using bandpass probing signals, the area of the equivalent excitation (acf) is ZERO (almost so, for the chirp case) or very much diminished. The acf of a chirp has a cluster of rippling lobes compacted around its center, and the area of the center cluster of the acf of the chirp is the substantial part of the total area of the acf. Zero area or very much diminished area of the compacted core (center) part of the equivalent excitation results in a tremendously diminished intensity of useful processed output (which is $r_o(t)$ multiplied by the area of the core part of the equivalent excitation), and this tremendously degrades SNR.

Consequently, the capability of the method of the invention to be free from zero-area problem very desirably relieves the tremendous SNR degradation of conventional method that uses a bandpass probing signal (typically, the signal chirp), especially when the resolution required is high.

b. The processing filter (a cross-correlator with a required reference input s(t)) of the method of the invention, which processes y(t), simultaneously reshapes the background noise ni(t) in a way entirely different from that when conventional method is used. The method of the invention can reduce COLORED background noise by its processing filter while the conventional method cannot. This is true when the band of the dominant part of the spectral density function of the background noise and the band of the probing signal overlap and this is especially true when the bands closely coincide (as it is so in the case of seismic geophysical exploration).

The total collected wave including y(t) and $n_i(t)$ is processed by cross-correlating it with the reference signal s(t). Using the method of the invention, with q(t) in s(t) being the basic version, s(t) is degenerated into a pseudo-random cyclically repetitive m-sequence in {+1,−1}. If q(t) in s(t) required is a non-basic version, to obtain the noise output we can post-filter the output noise obtained by using basic version of q(t) by a filter of impulse response function q(−t). The samples of the original background noise $n_i(t)$ are first scrambled by the cross-correlation operation with the PSEUDO-RANDOM sequence of s(t) into artificially de-correlated samples no matter how the original samples are auto-correlated, and then, the cross-correlator executes addition over the scope of the cross-correlation operation to yield a point of the output noise sequence. Therefore, the output noise time sequence yielded by such a processing cross-correlator is a sequence formed of sums of the scrambled samples of the input background noise which have been pseudo-randomly altered in polarities. Since the variance of the sum of a set of uncorrelated random variables of a given variance is equal to the sum of the given variances of the member random variables and such a variance of the sum is always a minimum and is less than the variance of the sum of correlated random variables of the same variance, using the method of the invention assures the output noise of the filter of the invention to be minimized.

In comparison with the above, using the matched filter pulse-compression probing method, the output noise is the original background noise filtered by the matched filter. When the matched filter has a passband which is almost the same as that of the background noise, the weights of the matched filter practically do not change the auto-correlation property of the noise samples. According to the rule of the variance of sum of random variables, the processed noise must be greater than that when the samples are de-correlated. Viewing the matched filter as a filter that rather freely passes the original background noise because the passband of the background noise closely coincides with the passband of the signal, the processed noise remains largely unchecked and can be said to be "preserved".

In seismic geophysical prespecting cases (in which chirp is the typical signal and its matched filter is its processor), the passband of the matched filter, which is the passband of the probing signal, oftentimes very closely coincides with the passband of the dominant part of the power spectral density function of the background noise. This is because that people intentionally design the probing signal to be such that its spectral density function can "well comply" with the "passband" of the earth to reduce probing signal transmission loss and that the background noise $n_i(t)$ is the combined response of the "earth filter" to random noises of all origins. Such a matched filter certainly would let the input background noise pass rather freely, and consequently the dominant part of the background noise would remain largely unchecked in the processed output.

Suppressing colored noise exploiting the noise-sample de-correlation procedure is effective only when the auto-correlation property of the original colored background noise can be sensed by the sampling procedure. When an $n_i(t)$ is cross-correlated with s(t) constituted of any pre-assigned set of discrete weights, the cross-correlation operation is intrinsically associated with an implied sampling of $n_i(t)$ at sampling interval which is $t_o$. In the case of the method of the invention, the implied sampling is due to cross-correlation operation with the pre-assigned discrete pseudo-random weights of the reference s(t). If the sampling interval of such a sampling is longer than the correlation time of the colored noise, the auto-correlation property of the colored noise cannot be revealed and the samples would appear as if the noise were not auto-correlated. That is to say, pseudo-random scrambling no longer can provide any noise suppression capability when the actual auto-correlation peculiarity of $n_i(t)$ which is the complication problem to be diagnosed and solved is disregarded. Therefore, a valid pseudo-random scrambling requires a short enough sampling interval at which auto-correlation property of the colored noise can be unveiled in the set of samples. Consequently, the bit duration of the m-sequence, $t_o$, is to be chosen narrower than the required sampling interval for valid sampling of the dominant part of the background noise $n_i(t)$ in order to satisfy sampling interval requirement of sampling theorem so that cross-correlation operation on $n_i(t)$ by s(t) can warrant reduction of colored background noise.

For $t_o$ being narrow enough such that it satisfies the requirement of valid sampling according to sampling theory, it can be shown that the mean square value of $n_o(t)$ can be kept minimized and invariant of the slimness of $t_o$ when the duration of the background noise to be processed is fixed. The duration of the background noise to be processed is equal to the duration of useful data which is $T+T_o$.

c. The third mechanism that lowers the output background noise is based on that the waveform of the active perturbing part of the equivalent excitation in the method of the invention can be READILY CONTROLLED to be NARROW and without out-stretching flanges while in the conventional matched filter method using bandpass signals the waveform of the equivalent excitation always has out-stretching flanges with side-lobes and cannot be controlled to be narrow. Consequently, mutual smearing of neighboring spikes can be well CONTROLLED in the method of the invention while in the conventional matched filter pulse compression method it cannot be so. The capability of the method of the invention to control the waveform of the core part of the equivalent excitation at will greatly relieves mutual smearing and hence greatly relieves SNR degradation. SNR degradation originating from mutual smearing is discussed in "The prior Art and the Disadvantages of the Prior Art".

It is clear that mutual smearing invalidates the optimality of matched filter. Therefore, in conventional method it cannot secure the maximized SNR even the background noise is white.

(6). On Preferred Choice of q(t) for Forming the Reference Signal: the Basic Version of the Reference Signal In the method of the invention, an appropriate q(t) in s(t) is required to be used for optimizing SNR of the processed output when it is practicable and rewarding. In the course of cross-correlation operation, the member q(t)s of s(t) will cross-correlate with the member p(t)s in x(t). When q(t) is appropriately chosen, it can optimally reshape (process) the p(t)s together its noise background of known spectral density function to yield an output with maximized SNR at the peak points of processed outputs which correspond to the individual spikes of $r_o(t)$. The individual elementary responses of $r_o(t)$ in response to the individual elementary p(t)s are bunched up by the cross-correlation operation of the single period m-sequence of x(t) (which generates x(t) and is hidden in y(t)) with the cyclically repetitive m-sequence of s(t). The bunched up (accumulated) response manifests improvement of SNR quality of the individual cross-correlation products of the member p(t)s with the member q(t)s.

For cross-correlation time economy in processing, we can split the cross-correlation operation of total collected wave with s(t) into a two-step operation equivalent. For the first step, we can employ the basic version of q(t) in forming s(t), which is a delta function of time, in place of straightforward employment of required q(t) in forming s(t). For the second step, to make up the missing functioning of required q(t) which is supposed to be present in s(t), a subsequent filter of impulse response function q(−t) is used to post-filter the output of cross-correlation operation. This is first stated in 2-(1), "General", of the SUMMARY OF THE INVENTION. We can justify that the two-step operation is valid based on the following discussion.

Performing cross-correlation-function operation on $\{y(t)+n_i(t)\}$ by s(t), we obtain the processed output $\{z(t)+n_o(t)\}$, where z(t) is [y(t) x s(t)], and $n_o(t)$ is [$n_i(t)$ x s(t)]:

$$z(t) + n_o(t) = \{y(t) + n_i(t)\} \times s(t)$$
$$= \{[x(t)*r_o(t)] + n_i(t)\} \times s(t)$$
$$= \{[x(t) \times s(t)]*r_o(t)\} + \{n_i(t) \times s(t)\}$$

Tolerating a unit strength delta function of time to be represented as a unit pip in a sequence and vice versa, we can view a function of time constituted of unit strength delta functions represented as a sequence in pips of unit strength and vice versa: We tolerate to have a double connotation for an expression containing delta functions only to be interpreted either as a function of time or as a sequence. Based on such toleration, let us express x(t) as:

$$x(t) = x_1(t)*p(t)$$

and s(t) as:

$$s(t) = s_1(t)*q(t)$$

Here, $x_1(t)$ can be understood to be the single period of m-sequence in $\{+1,-1\}$ and $s_1(t)$ can be understood to be the cyclically repetitive m-sequence in $\{+1,-1\}$. $s_1(t)$ is the basic version of s(t).

Accordingly, we have $$\begin{aligned}z(t) + n_o(t) &= \{[x_1(t) \times s_1(t)] *[p(t) \times q(t)]\} * r_o(t) + \\ &\quad \{[n_i(t) \times s_1(t)] * [\delta(t) \times q(t)]\} \\ &= \{c_m(t) * [p(t) * q(-t)]\} * r_o(t) + \\ &\quad \{[n_i(t) \times s_1(t)] * [\delta(t) * q(-t)]\} \\ &= \{x(t) * r_o(t) \times s_1(t) + [n_i(t) \times s_1(t)]\} * q(-t) \\ &= \{[y(t) + n_i(t)] \times s_1(t)\} * q(-t)\end{aligned} \quad (4)$$

where $c_m(t) = x_1(t) \times s_1(t)$ is the cross-correlation function of the single period m-sequence with the cyclically repetitive m-sequence and is the cyclical repetitive compressed version of the single period m-sequence, and $c_m(t) * p(t) = x(t) \times s_1(t)$ is the equivalent excitation with s(t) being equal to $s_1(t)$; $\delta(t)$ is the delta function of time. Here, in time domain, the symbol * stands for convolution operation and x stands for cross-correlation-function operation. Equation (4) shows that when a non-basic version q(t) is required to be used, one can in the first step use the basic version of q(t) to obtain a first-step processed output, and then in a second step post-filter the first-step processed output by a filter of impulse response function $q(-t)$ to finally obtain the processed output as if the required non-basic version of $q(t)$ is used in $s(t)$. Therefore, we call $s(t)$, in which a delta function is used for $q(t)$, the basic version of the reference signal.

We see when basic version of $q(t)$ is chosen, we may tolerate that an $s(t)$ with such a $q(t)$ can be virtually degenerated into a simple cyclically repetitive m-sequence in number set $\{+1,-1\}$ which we designate as $s_1(t)$. Consequently, cross-correlation operation with such a degenerated $s(t)$ as a reference channel input is turned into a simple "polarity-sample and add" operation which results in overall processing time economy. Generally, $q(-t)$ is a short duration filter; the process of post-filtering a signal by using $q(-t)$ is very simple.

The above equation (Eq. (4)) can also be expressed:

$$\begin{aligned}\{y(t) + n_i(t)\} \times s(t) &= \{[y(t) + n_i(t)] \times s_1(t)\} \times q(t) \\ &= \{[x_1(t)*p(t)*r_o(t) + n_i(t)] \times s_1(t)\} \times q(t) \\ &= <[x_1(t) \times s_1(t)]*p(t)]*r_o(t)> \times q(t) + \\ &\quad [n_i(t) \times s_1(t)] \times q(t) \\ &= \{<[x_1(t) \times s_1(t)]*p(t)]*r_o(t)> + \\ &\quad [n_i(t) \times s_1(t)]\} \times q(t)\end{aligned} \quad (5)$$

where in the last line $[x_1(t) \times s_1(t)]*p(t)$ is the equivalent excitation (with $s(t)=s_1(t)$) and $[n_i(t) \times s_1(t)]$ is $n_i(t)$ processed by basic version of $s(t)$. Equation (5) states that processing $[y(t)+n_i(t)]$ by cross-correlating it with a non-basic version of $q(t)$ in $s(t)$ is equivalent to processing the response of $r_o(t)$ to an equivalent excitation $[x_1(t) \times s_1(t)]*p(t)]$ plus the processed noise $[n_i(t) \times s_1(t)]$ by cross-correlating them with the required $q(t)$.

Therefore, this set up is parallel to the classical matched-filter. If background noise is white, the require $q(t)$ is $p(t)$, which is $Lp(t)$ within a multiplier due to L. This reasoning justifies that the SNR achievable in the method of the invention is equal to the theoretical maximum as stated by the matched filter theory since the problem of mutual smearing due to the crowdedness of spikes in $r_o(t)$ can be effectively relieved by making $Lp(t)$ slim enough. As we explained in Section 3 on the Prior Art and Disadvantage of the Prior Art (BACKGROUND), the matched filter does assure maximized output SNR if the excitation is so narrow that there is no mutual smearing problem. In contrast, in the conventional method, the mutual smearing problem cannot be solved. Therefore, in conventional method, the matched filter theory is invalid.

When $n_i(t)$ is colored and when $p(t)$ is slim enough, likewise we can properly choose a suitable $q(t)$ under the guideline of using the generalized matched filter theory. The suitable $q(t)$ does not equal to $p(t)$ when $n_i(t)$ is nonwhite.

However, for simplicity's sake, as $p(t)$ is really slim, $q(t)$ is preferably chosen a delta function of time: To choose $q(t)$ a basic version.

(7) The Issues of the Required Duration of Probing Signal and the Duration of Useful Data Proper operation of a probing system using the method of the invention requires a properly designed duration T of the probing signal. Let us define $T_o$ as the time duration for the signal to travel over the longest ray path in which the energy of the probing signal has been consumed up to such a low level that is marginally detectable after processing. Clearly, making T longer than $T_o$, we will have a likeness of $r_o(t)$ in a single period of repetition free from overlapping of any significant trailing part of it with its early part: It is the likeness of $r_o(t)$ mainly corrupted by $n_o(t)$. $T_o$ is referred to as the duration of useful processed output of the system of the invention. The T thus required, which is no shorter than $T_o$, is referred to as the required duration of the probing signal. Duration of total collected wave needed in processing for obtaining cross-correlation function is to be no shorter than $T+T_o$ so that practically no useful probing information (which is carried by the convolution of $x(t)$ of duration T with useful part of $r_o(t)$ which has duration $T_o$) is lost, yet recommendedly it is not to be much longer than $T+T_o$ ($2T$ is recommended) so that not too much data that mainly carry background noise, which would only degrade SNR, are processed. $T+T_o$ is referred to as the duration of useful data of total collected wave which is needed to be processed for obtaining the desired processed output.

(8). Temporal-Narrowness Requirement, Feasibility of Employing Transmitting Transducers of Reduced Power Rating, and Concluding Remarks Regarding the Method of the Invention We learned from section (4) above that the intensity of processed useful output of the method of the invention is invariant of $t_o$ or invariant of the width of $p(t)$ when T of $x(t)$ is fixed and energy of $x(t)$ is fixed under the condition that $t_o$ is narrow. It is concluded in section (5) above that when $T+T_o$ is fixed with $n_i(t)$ being COLORED under the condition that $t_o$ is narrower than the sampling interval required for valid sampling of the colored noise, the mean square value of $n_o(t)$ will not change with the width of $t_o$ chosen. Consequently, under the conditions listed above, when we change (decrease) the width of $p(t)$ and accordingly the width of $t_o$, the intensity of the useful output and the SNR corresponding to the minimized $n_o(t)$ of output would not change (decrease).

Let us investigate the mechanism of some superficially unexpected peculiarities of the method of invention when we make the width of $p(t)$ narrower than the width of the impulse response of the transmitting transducer under the condition that duty-cycle is kept fixed. According to the theory of m-sequence, the energy spectral density function of an $x(t)$ is L times the energy spectral density function of $p(t)$; they are the same function of frequency within a multiplication constant. When the width of $p(t)$ is chosen NARROWER than the impulse response function of the TRANSMITTING TRANSDUCER, the energy spectral density of $x(t)$ is accordingly wider than the passband of the transmitting transducer, and $x(t)$ cannot freely pass through the transmitting transducer into the probed space. This results in reduction of mean square intensity of the response of the transmitting transducer to such an $x(t)$ at its output port and also reduction of mean square intensity of response (state of being energized) of the space to such an $x(t)$. Interesting enough, returning to the last paragraph as based on section (4), under the conditions that when T of $x(t)$ is fixed, the energy of $x(t)$ is fixed, and $p(t)$ is narrow enough, the intensity of processed useful output of the method of the invention is invariant of the width of $p(t)$ and does not decrease with decrease of it. That is, on one hand, under the conditions that when T of $x(t)$ is fixed, the energy of $x(t)$ is fixed, the intensity of $z(t)=Lp(t)*r_o'(t)$ does not decrease with width of $p(t)$, and on the other hand, the mean square intensity of $x(t)*r_o'(t)$ shrinks with decreasing width of $p(t)$. These two facts seem that they are not consistent. However, these two facts are both true. As a result, using the method of the invention and forcing $p(t)$ to be narrower than the width of the impulse response function of the transmitting transducer, we have the feasibility of using transmitting transducer of REDUCED POWER RATING to validly fulfill a desired probing job and at the same time having the probed space/object energized at a reduced level while after cross-correlation processing there is eventually yielded a useful processed output z(t) at an unreduced intensity. This is a useful contribution of the method of the invention: It furnishes a thorough solution to the problem of bulkiness of transmitting transducer which is currently a forbidding stumbling block to wider employment of conventional pulse-compression probing method/system. Energizing the probed space/object at a reduced intensity can be very helpful in many probing system applications. For example, it can be exploited in pulse-compression medical probing instrument to decrease the intensity of probing power the patients are illuminated by.

FIGS. 6-(1) and 6-(2) are computer simulation plots for showing that with duration and energy of x(t) fixed, for duty-cycle being unity and fixed, the response of an excited system h(t) to the core part Lp(t) of e(t) (the equivalent excitation) practically does not change with the width of p(t) (Please compare FIG. 6-(1)-$g$ with FIG. 6-(2)-$g$) when p(t) is narrower than the finest detail of ups and downs of the impulse response function of the excited system h(t), while the mean square value of the response of the system h(t) to x(t)s of narrow p(t)s is reduced when the width of p(t) is made narrower (Please compare FIG. 6-(1)-$f$ with FIG. 6-(2)-$f$). In FIGS. 6-(1) and 6-(2), the durations and energy of the two different x(t)s are same, but the p(t) in FIG. 6-(2) [L=$(2^7-1)$=127] is about half as wide as the p(t) in FIG. 6(1) [L=$(2^6-1)$=63]. From top to bottom, the sub-numbered figures are:

(a): clocking m-sequences for L=63 and L=127;

(b): wavelets p(t)s for L=63 and L=127;

(c): x(t)s for L=63 and L=127;

(d): the impulse response of a given excited system h(t);

(e): the elementary response of the same system to the different p(t)s;

(f): the respective responses of the same system h(t) to the different x(t)s;

(g): the respective responses of the same system h(t) to the different Lp(t)s (viz., [Lp(t)*h(t)]s), as respectively shown in FIG. 6-(1)-$g$ and FIG. 6-(2)-$g$ which are in fact respectively obtained by cross-correlating the different [x(t)*h(t)]s (as shown respectively in FIG. 6-(1)-$f$ and FIG. 6-(2)-$f$) with their respective reference signals (different s(t)s) since [x(t)*h(t) x s(t)]=[Lp(t)*h(t)], wherein the different s(t)s are respectively cyclical repetitions of FIG. 6-(1)-$a$ and FIG. 6-(2)-$a$; and (h): the core parts of the equivalent-excitation/compressed-versions, i.e., Lp(t)s (shown respectively in FIG. 6-(1)-$h$ and FIG. 6-(2)-$h$ are the different Lp(t)s). Note the areas of the two Lp(t)s are the same.

In FIGS. 6-(1) and 6-(2), h(t) is the system function for the general case. For the particular case of our topic of concern, the general case system function h(t) is specified to be $r_o'(t)$.

To save space of the plots, the vertical scales of (g) and (h) are reduced by a factor of 25.

Now, we can collectively see the great difference in energy/power related problems between the method of the invention and the conventional method using bandpass probing signals:

Using the conventional method, excitation energy is wasted in vain especially when one demands resolution, and the transmitting transducer and the probed space/object are over-energized for "nothing". This demands increased power rating of the transmitting transducer. This is due mainly to the zero area problem.

Using the method of the invention, we do not have to use increased power rating transmitting transducer and the probed space/object is not over-energized since we do not have the zero area problem. This is always true at any resolution including high resolution. Further, when we forcibly choose the width of p(t) (and accordingly the width of $t_o$) to be narrower than the impulse response of transmitting transducer, we can further reduce the power rating of the transmitting transducer and the intensity of being energized of the probed space/object.

We know that choosing the width of p(t) adequately narrow is good for resolution since if the core part of the equivalent excitation Lp(t) is not slim enough relative to the required finest details of $r_o(t)$, it would blur $r_o(t)$ (and at the same time reduce the intensity of the processed output). We also know that choosing p(t) adequately narrow is good for reducing mutual smearing of the neighboring spikes in $r_o(t)$ and hence reducing noise due to mutual smearing. We therefore may say the method of the invention is BIASED toward choosing a narrow p(t) (and accordingly a narrow width of $t_o$ to keep a fixed good duty-cycle) for resolution and SNR performance qualities. We now see even more: feasibility of using transmitting transducer of further reduced power rating can be achieved when we choose the width of a p(t) (and accordingly a $t_o$) further narrow. Such a further bias toward a further narrowness of the width of p(t) and $t_o$ is called by the inventors the TEMPORAL-NARROWNESS REQUIREMENT. By choosing the width of p(t) and $t_o$ further narrow we mean that the widths of p(t) and $t_o$ are chosen narrower than the width of the impulse response function of the transmitting transducer. Meeting the temporal-narrowness requirement implies all kinds of performance upgrading plus the feasibility of using transmitting transducer of reduced power rating to achieve wanted valid probing.

An electrical pre-filtering circuit can be placed on the electrical input port side of the transmitting transducer to retard free passing of x(t) into the transmitting transducer and then into the space in place of retarding x(t) by the transmitting transducer itself so that risk of mechanical over-stress in transmitting transducer can be relieved. The electrical pre-filtering circuit can be physically implemented as a part of the transmitting transducer. Impulse response function of the entire cascade including the pre-filtering circuit, the electro-mechanical transducing mechanism, $r_o(t)$, and the receiving transducer is $r_o'(t)$. It is required that $r_o'(t)$ is capable to reveal the required finest details of $r_o(t)$.

3. The Block Diagram of an Elementary Realization of the Method of the Invention FIG. 3-$a$ shows the block diagram of an elementary realization of the method of the invention. It is presented as an analog system.

The block labeled "x(t)" (301) is the finite duration probing signal providing block; it supplies a string of wavelets of pulse waveform p(t) polarity-controlled by a single period m-sequence of a chosen order n. The string is denoted as $x(t)$. Outside the single period interval, $x(t)$ is zero everywhere. The amplitude of $x(t)$ is adjustable. $x(t)$ is to be started by a starting signature. The bit duration of the m-sequence is $t_o$.

The block labeled "$r_o(t)$" (303) stands for the space between a given transmitting site and a given receiving site. $r_o(t)$ is the true impulse response function of the space. $x(t)$ is transmitted at the given transmitting site through suitable transducer(s) (302) into the space to be probed. Here, the frequency domain transfer function of the transmitting transducer is at the moment assumed to be ideally unity for simplicity's sake. After travelling in the space through the multiple ray paths, $x(t)$ is reshaped by $r_o(t)$ to become $x(t)*r_o(t)$ which is called the composite received signal $y(t)$ (304). $y(t)$ is picked up at the given receiving site by receiving transducer(s) (305) of a transfer function which is at the moment also assumed to be ideally unity for simplicity's sake. As a matter of fact, none of the transducers can be manufactured to have ideal transfer functions of unity, and they can only be manufactured to have band-limited characteristics which in cascade with $r_o(t)$ forms the impulse response function of the overall cascade $r_o'(t)$ which must be more or less wider than $r_o(t)$. In FIG. 3, as we stated in the above, we assumed $r_o'(t)$ to be equal to $r_o(t)$. The realistic impulse response functions of the transducers are in fact such that $r_o'(t)$ can (/or can only) reveal the required (/or limited) finest details of $r_o(t)$. The space 303 is assumed to be linear. At the receiving site there is an additive background noise denoted as $n_i(t)$ (306) superposing on $y(t)$. $[y(t)+n_i(t)]$ (307) is the total collected signal (wave).

The block labeled x (311) with an s(t)-source block (312) under it is the processor block 3 10. 310 is the filter for processing $y(t)$ which is the response of $r_o(t)$ to $x(t)$. The inventors call block 3 10 the sorter/buncher for a $y(t)$ because it has the capability of sorting/bunching the individual elementary responses of $r_o(t)$ to the elementary wavelets of $x(t)$. Since the space 303 is (assumed to be) linear, mathematically equivalently the sorter/buncher (310) performs sorting/bunching operation on $x(t)$. x in block (311) is a cross-correlator. $[y(t)+n_i(t)]$ (307) is the signal input to the signal channel of 311, and the s(t)-source block (312) provides the reference input to the reference channel of 311. $s(t)$ is a polarity-controlled string of wavelets of pulse waveform $q(t)$ with the polarity-controlling sequence being the cyclical repetition of the m-sequence of $x(t)$. In the process of obtaining cross-correlation function of $[y(t)+n_i(t)]$ with $s(t)$, it is understood that $s(t)$ undergoes a step of shift in position relative to $[y(t)+n_i(t)]$ each time a complete round of cross-correlation operation of $[y(t)+n_i(t)]$ with $s(t)$ is completed. In each round of cross-correlation operation, $[y(t)+n_i(t)]$ is multiplied by $s(t)$ at a precisely assigned relative shift position and the product is integrated along time axis. Integration starts at the starting point of $y(t)$ which is the same starting point of $x(t)$, and can be terminated at the point where $y(t)$ fades to such a weak intensity that it no longer can contribute to useful processed output 308 in the background of processed noise 309. The process of cross-correlating $[y(t)+n_i(t)]$ with $s(t)$ at consecutively shifted steps in the cross-correlator 311 yields the cross-correlation function of $[y(t)+n_i(t)]$ and $s(t)$. This process is referred to as cross-correlation-function operation ON $[y(t)+n_i(t)]$ BY $s(t)$: $[y(t)+n_i(t)]$ is fed to the signal channel of 311 and $s(t)$ is fed to the reference channel of 311. When $q(t)$ is chosen to be a delta function of time, let us tolerate $s(t)$ being degenerated into a mere m-sequence in $\{+1, -1\}$ and multiplication of $[y(t)+n_i(t)]$ by $s(t)$ is turned into polarity-sampling by the m-sequence in $\{+1, -1\}$.

The cross-correlation function as output of the block 310 is $z(t)$ (308) plus $n_o(t)$ (309). It is the end result of the acquisition process of the method of the invention. $z(t)$ is $[y(t) \times s(t)]$ and $n_o(t)$ is $[n_i(t) \times s(t)]$. The single period m-sequence which controls the polarities of $p(t)$s of the transmitted string $x(t)$ is clocked by a clock with a bit duration $t_o$. In the processor block 310, reference channel input $s(t)$ to the cross-correlator is formed on the basis of being timed by the cyclically repetitive m-sequence which can be clocked by its own clock. The two clocks may be differently located. The m-sequence controlling $q(t)$s in the reference signal $s(t)$ of 310 MUST BE SOMEHOW INTERLOCKED in timing with the m-sequence controlling $p(t)$s in the probing signal $x(t)$ in 301. The dotted line connecting 301 and 310 indicates interlocking of timing clocks in 301 and 310.

Let us be reminded that we have shown (see Summary of the Invention) that when the width of $p(t)$ (and hence $t_o$) is narrow enough, the intensity of $z(t)$ is invariant of the change of the width of $p(t)$ (and hence $t_o$) (with T and energy of $x(t)$ being fixed), while the intensity of the signal transmitted through the transmitting transducer into the space decreases with the decrease of the width of $p(t)$ when the width of $p(t)$ is narrower than the impulse response function of the transmitting transducer and hence narrower than the width of $r_o'(t)$. Note that decrease of the intensity of the signal transmitted through the transmitting transducer into the space suggests feasibility of using transmitting transducer of reduced power rating to excite the space and also lowering of state of being energized of the probed space/object. In the above, by saying the width of a $p(t)$ being narrow enough we mean the width of $p(t)$ being narrower than the finest detail of $r_o'(t)$.

FIG. 3-b is an equivalent of FIG. 3-a. Since the space 303 is (assumed to be) linear and the processor 310 is linear, the positions of the space 303 and the processor 3 10 in the block diagram are interchangable. One sees in FIG. 3-b that the space is equivalently excited by $\{x(t) \times s(t)\} = \{c_m(t) * [p(t) \times q(t)]\}$ (321) which is the equivalent excitation. The equivalent excitation is $\{c_m(t) * p(t)\}$ when basic version is used.

In FIG. 3-b, there is also a dotted line connecting the probing signal providing block 301 and the s(t)-source block 312. It is also used to indicate that these blocks are interlocked in clocking. It is important that the clocks of the two m-sequences must be INTERLOCKED. One can see that this is crucial from FIG. 3-b: Without such a clock interlocking relationship, one cannot form the desired single spiked $c_m(t)$ in cross-correlation-function operation. Proficient precise interlocking of the clocks, or strict pairing relationship between the two m-sequences must be observed however the implementation of block diagram FIG. 3 is modified.

BRIEF DESCRIPTION OF THE DRAWINGS

FIG. 1 Shows the drawings for explaining the notions of equivalent excitation and fictitious filter. In FIG. 1-c, 105 is the equivalent excitation of the system shown in FIG. 1-a. In FIG. 1-d, the filter 106 in dotted line is the fictitious filter which blurs the true $r_o(t)$.

FIG. 3-a of FIG. 3 shows the block diagram of an elementary realization of the principle of the method of the invention. Space 303 is (assumed to be) linear. The processor block 310 and the space 303 are interchangable in position in the system with respect to the probing signal provided by 301. FIG. 3-b explains that the mechanism for compressing the probing signal x(t) of the method of the invention requires interlocking of clocks timing the formation of x(t) and the formation of s(t). Interlocking is indicated by a dotted line. Since the same processor block 310 also processes noise 306, moving 310 to a position in front of 303 would leave noise skipped of being processed, and to take into consideration of processing the noise, a 310 (processor block) dedicated to processing noise (306) is added into the system of FIG. 3-b. The system shown in FIG. 3 is analog.

FIG. 5 shows the waveforms at different points of the system of a preferred embodiment of the invention:

FIG. 5-(a) shows a clock-timed m-sequence in $\{+1,-1\}$ for n=3 (L=7). Nominally, it is indefinitely cyclically repetitive. A single cycle (period) excerpt of it is used to amplitude-code (to polarity-control, for example) a string of p(t)s to form x(t).

FIG. 5-(b) shows the probing signal x(t). x(t) is a string of rectangular p(t)s of width $t_o$ polarity-controlled by the single period excerpt of the m-sequence. x(t) and the m-sequence are lined up with it as shown in FIG. 5-(a) and FIG. 5-(b). Duration of x(t) is $T=Lt_o$ which is $7t_o$ in the example.

FIG. 5-(c) shows the $r_o(t)$ of the space 100. The curve given in this figure artificial; it is just for explaining as an example. $r_o(t)$ extends endlessly but fades off with t. Due to residual processed background noise, only a part of the likeness of $r_o(t)$ is useful. $T_o$ is the duration of useful processed output finally obtained after processing.

FIG. 5-(d) shows the composite received signal $x(t)*r_o(t)$. It is designated as y(t). Vertical lines within the envelope y(t) are samples of y(t) sampled at sampling interval $t_s$. The sequence of samples after being recorded in memory (45/53) is no longer necessarily function of time.

FIG. 5-(e) shows the additive background noise $n_i(t)$ corrupting y(t). $n_i(t)$ superposes on y(t) and is not separable from it. Vertical lines within the envelope $n_i(t)$ are samples of $n_i(t)$ sampled at sampling interval $t_s$. The sequence of samples after being recorded in memory (45/53) is no longer necessarily function of time. The samples of $n_i(t)$ are aligned with the samples of y(t) in pairs. They are in fact summed up and are not separated from each other. The set of sums is called the data set.

FIG. 5-(f) shows the reference weight set at zeroeth shift step position as being correctly paired with the data set formed of sampled FIG. 5-(d) and FIG. 5-(e). In this example, basic version of s(t) is used. Note that although the reference weight set in this shift step position appears same as the m-sequence shown in FIG. 5-(a), it is not a function of real time; the horizontal axis of FIG. 5-(f) does not represent time. When cross-correlation operation is performed, the m-sequence of s(t) shown in FIG. 5-(f) and the m-sequence of x(t) shown in FIG. 5-(a) are precisely lined up to have the elements paired. In such a sense one may assume to endow a time absissa to the sequence of FIG. 5-(f) as if it is a function with abscissa counted in real time.

The shaded areas below FIG. 5-(f) show zones of spanning of the windows for truncating the nominally indefinitely cyclically repetitive reference weight set m-sequence into an active reference weight set of finite number of members. The active reference weight set members are members that actually participate in cross-correlation operation. The windows shown respectively span over durations $T+T_o$ and $2T$ wide if counted in terms of real time. The left edges of the zones marginally include the windows' coverages and the right edges of the zones are marginally outside of the windows' coverages. If counted in terms of real time, $T+T_o$ is the minimum required width for the window, while $2T$ is the recommended width of the window. When a member of the reference weight slips out from the window, there is a member sneaking into the window;

FIG. 5-(g) shows the reference weight set at a first shift step position which is one step later than it is in FIG. 5(f). The members of it are also correctly paired with members of the data set at this shift step. Likewise, the horizontal axis of FIG. 5-(g) does not necessarily represent time;

FIG. 5-(h) shows the reference weight set at a second shift step position which is two steps later than it is in FIG. 5-(f). The members of it are also correctly paired with members of the data set. Likewise, the horizontal axis does not necessarily represent time;

FIG. 5-(i) shows the equivalent excitation of the example. It is equal to the cross-correlation function of the single period of the probing signal x(t) (FIG. 5-b) with s(t) (FIGS. 5-f, 5-g, 5-h, and so on, if they are interpreted as functions of real time). We can see that there is no protruding side-lobes and the area of the central part of it is equal to $Lt_o=T$. When T is fixed, the area does not change with $t_o$ (or L).

FIGS. 6-(1) & 6-(2) illustrate invariance of intensity of $Lp(t)*r_o'(t)$ with narrowing of p(t) and reduction of mean square of intensity of $x(t)*r_o'(t)$ with narrowing of p(t) when T and energy of x(t) are fixed and p(t) is narrow.

DETAILED DESCRIPTION OF A PREFERRED EMBODIMENT OF THE INVENTION

Figure 2:
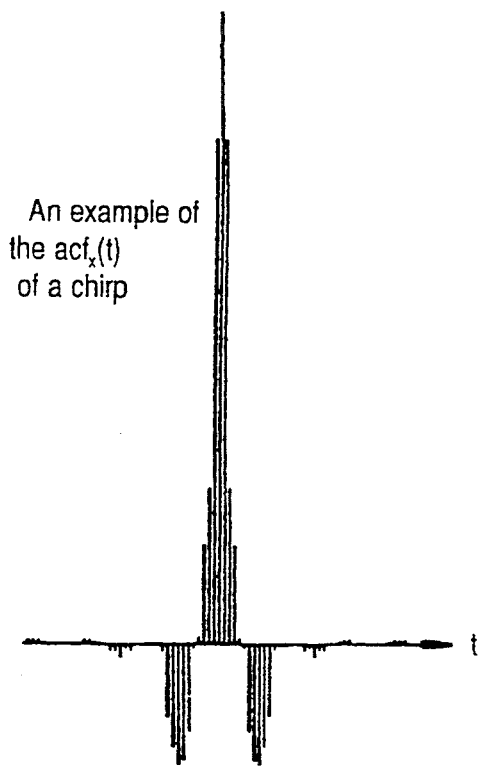
FIG. 2 shows an example of the acf of a chirp signal. Note the side-lobes are compacted around the main lobe and they form with the main lobe the core part of acf. Note also that the area of the core part of the acf of a chirp looks to be zero as a result of the zero area problem.
Figure 4:
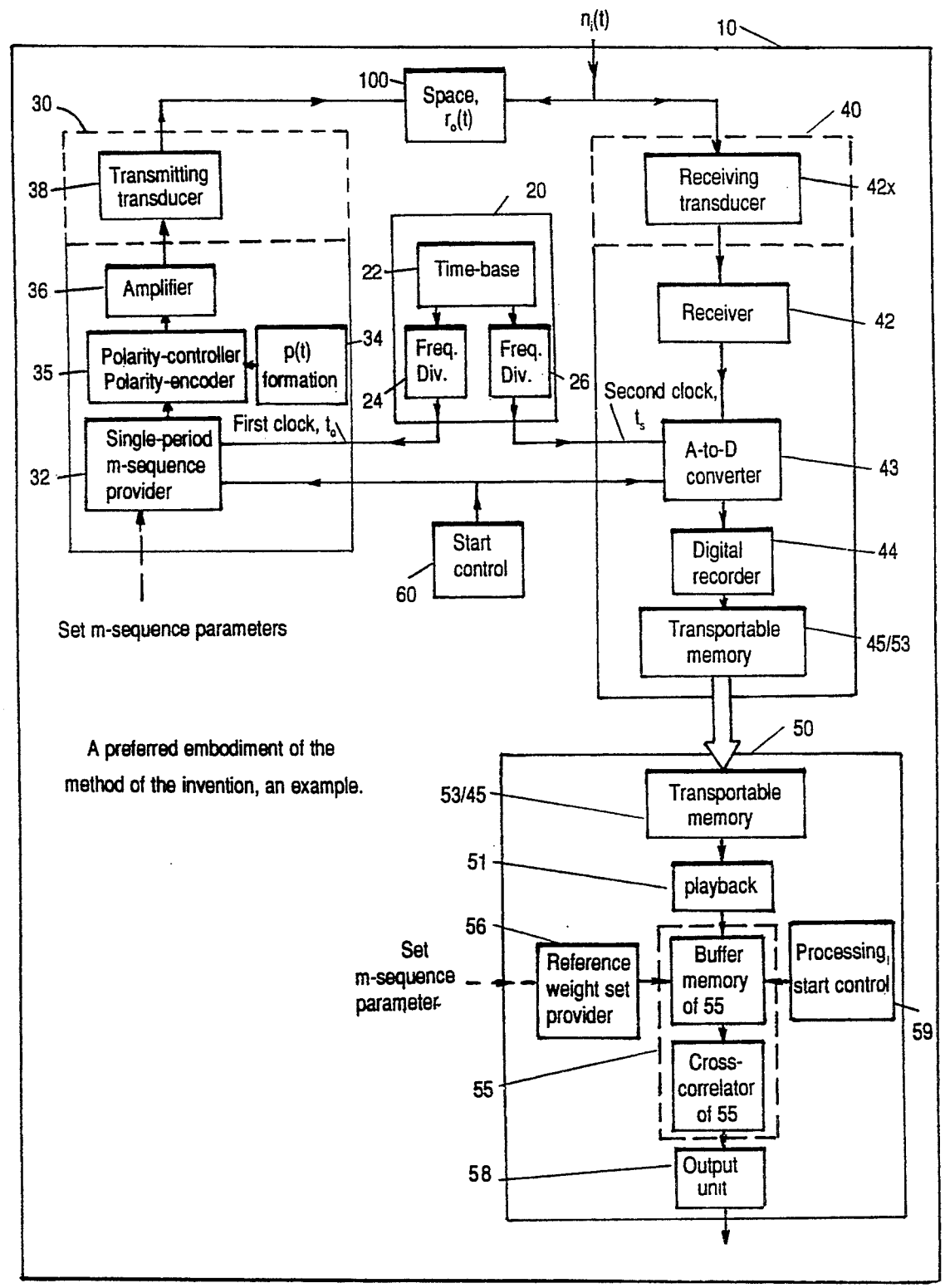
FIG. 4 shows a preferred embodiment of the invention. It is a hybrid analog-digital system. 30 is the probing signal supplier block. Its output is the analog probing signal. 100 is the space to be probed. 40 is the receiving-recording block. The input to 40 is analog while the analog signal received by 40 from the space is A/D converted to become digital and to be digitally recorded. The recorded received signal is conveyed to processor block 50. 50 is digital. The differential quantization-level of the A/D convertor should be refined enough so that no required useful probing information carried by y(t) would be lost due to quantization error.

In FIG. 4, there is shown at 10 a system for signal travel times estimation in a linear space using finite duration compressible probing signals featuring elimination of side-lobes, enhanced resolution, and upgraded SNR when the space probed has multiple ray paths that result in crowded arrival times and especially when the background noise is non-white. The features are improvements over existing conventional methods. A very special feature of the system of FIG. 4 that transmitting transducer of reduced power rating can be used is achieved when the signal parameter is chosen to meet a TEMPORAL-NARROWNESS REQUIREMENT. The TEMPORAL-NARROWNESS REQUIREMENT is that the width of p(t) is chosen notably narrower than the impulse response function of the transmitting transducer. Comparison is made on the common bases of employing the same excitation energy and using the same basic transmitting and receiving equipment.

FIG. 4 is an example of a preferred embodiment of the present invention. While FIG. 3, which depicts the essentials of a basic system of the invention, presents the method of the invention as an analog system, the example shown in FIG. 4 is a hybrid analog-digital system. The analog system of FIG. 3 is illustrative of what the method of the invention is in principle. However, matters such as the realization of a precision cross-correlator by analog approach is not practicable. Also, as one has the need for recording the received signal which is to be repeatedly played back with no error, the need for precise interlocking of different clocks, and so on, the method of the invention is to be implemented as a hybrid analog-digital system for practicability.

While this detailed description given here uses terminologies of the seismic geophysical prospecting profession for explanation of operation, it is understood that the method of the invention is applicable to all other pulse-compression signal travel times estimation systems. It is also understood that using known electronics art, variations of the example are readily derivable on the basis of the spirit of the example given here.

System 10 is divided into a clock section 20, a transmitting section 30, a receiving-recording section 40, a processing section 50, and an acquisition start control unit 60. The space to be probed is labelled 100. Let us first have a general look at the relationships between the different blocks of system 10.

The transmitting section 30 generates an analog probing signal x(t) and transmits it into the space 100 at a given transmitting site. x(t) is a string of elementary LOWPASS wavelets. Each of the wavelets individually excites the space to be probed.

The space 100 to be probed characterizes having an impulse response function denoted as $r_o(t)$; $r_o(t)$ is the true response of the space between the transmitting point and the receiving point to a delta function excitation. $r_o(t)$ does not contain blurring effects due to the transmitting and the receiving transducers. The blurring effects of the transducers are ignored in the Description only for convenience. They are to be taken into consideration when they blur $r_o(t)$. As we mentioned before, the impulse response of the cascade of the transducers is denoted as $r_o'(t)$, and $r_o'(t)$ has to be able to reveal required finest details of $r_o(t)$.

The receiving section 40 receives at a given receiving site the response of the space 100 to x(t). The response of 100 to x(t) is designated as y(t): $y(t)=x(t)*r_o(t)$. y(t) is contaminated by an additive background noise $n_i(t)$ picked up at the receiving site. $n_i(t)$ is a combined noise originating from all kinds of undesired unpredictable agitations located differently in the space. To 40 is also given the task of recording the superposition of y(t) and $n_i(t)$.

The recorded digitized $[y(t)+n_i(t)]$ (the data set) is passed from 40 to the processor section 50 to be processed. In the example of the system shown at 10 in FIG. 4, the data set of $[y(t)+n_i(t)]$ is recorded into a physically transportable memory 45/53 in 40. 45/53 is moved into 50 when processing is to be carried out and it is relabelled as 53/45 when it is in 50. The recorded data set of $[y(t)+n_i(t)]$ in 53/45 is loaded into the buffer memory of a cross-correlator processor in 50 before it is to be processed.

The output of 30 and input to 40 are analog. In 40, received analog signal $[y(t)+n_i(t)]$ is converted into its digital version, the data set, for digital recording. Output of 40 is digital, and 50 is digital.

Being analog, in 30 there is a timing clock, called the first clock of the system 10, for timing the m-sequence which controls the polarities of constituent wavelets in x(t). In 40, there is another timing clock called the second clock of the system 10. The second clock is used for timing sampling of $[y(t)+n_i(t)]$ in the analog-to-digital converter (A/D converter) in 40. The method of the invention requires that the first clock (in 30) and the second clock (in 40) MUST BE somehow INTERLOCKED. In the example shown in FIG. 4, interlocking of the two clocks is implemented by letting the two clocks share a common time base. The two clocks are both based on a common time base in section 20.

Data acquisition is initiated when start control unit 60 emits a start control signature to both 30 and 40 to start transmitting x(t) and to start A/D converting $[y(t)+n_i(t)]$ and recording.

Section 20 and unit 60 can be located in any suitable locations. Recommendedly, thay are located in 40.

The above is a general sketch of the relationships between the different blocks of 10. To explain the operation of the system 10 in more detail, we have the following.

An m-sequence providing device 32 in section 30 supplies a clock-timed m-sequence in 1-states and 0-states in compliance with a pre-chosen primitive polynomial of a pre-chosen order n. Using known art, an m-sequence in state-set $\{1, 0\}$ is readily convertible into an m-sequence in number-set $\{+1,-1\}$ or $\{-1,+1\}$. The first clock of the system which clocks the m-sequence is based on frequency divider 24, and 24 is derived from a time base provided by 22 of 20. The bit duration of the first clock is $t_o$. It is adjustable by the operator of the probing system. The number of bit durations, L, contained in one period of the m-sequence is also adjustable. L is equal to $2^n-1$.

A chosen single period of the cyclically repetitive m-sequence is used to polarity-control a finite long string of LOW-PASS wavelets of waveform p(t). The finite long string of p(t)s is the finite duration probing signal x(t). t stands for time. The width of a p(t) is chosen to be commensurate with resolution required and even much narrower. The duration of x(t) is T; it is equal to $Lt_o$.

The ratio of the width of p(t) to $t_o$ is called the duty-cycle. In order to achieve time-economy in raw data acquisition, duty-cycle is set to be close to unity.

An example of x(t) with n=3, L=7, $t_o=1$ unit and p(t) being a rectangle of width $t_o$ is shown in FIG. 5-b. The corresponding polarity-controlling time-clocked m-sequence in $\{+1,-1\}$ is shown in FIG. 5-a. Note that the m-sequence is cyclically repetitive while x(t) is a finite long string of p(t)s; it is polarity-controlled by the single period of the m-sequence as can be seen in the figures. In this example duty-cycle is unity. Generally, the n chosen in actual practice may be as high as 10, 11 . . . or greater; it is not that small as 3. The example shown in FIG. 5 with n=3 is used only for illustrating operating principle.

The elementary wavelet forming circuit 34 for forming a p(t) may be a pulse-forming circuit which is excited by a clock pulse supplied by frequency divider 24. Polarity-control of p(t) is performed by the polarity encoder 35. In the case when p(t) is a rectangular wave of width $t_o$, m-sequence providing device 32, p(t) wavelet generator circuit 34, and polarity encoder 35 may be combined and simply implemented as a whole by a maximal length feedback shift-register or a digital computer clocked at bit duration $t_o$. Forming a polarity-controlled string of p(t)s may be implemented by any other convenient circuit means.

The method of the invention requires that p(t) MUST BE a LOW-PASS pulse wavelet. p(t) must be such a pulse that the parts of the central part of it must be mutually aiding in contributing to sum area. Stated otherwise, in the central part of p(t), it is desired that no lobes of opposite signs and noticeable sizes are tolerated to exist. This precludes the use of bandpass pulses, such as sinusoids/cosinusoids in pulsed envelopes, for a p(t). In the example given, we employ a rectangular p(t) of width $t_o$. Please see FIG. 5-b. As another example, we can employ a raised cosine pulse for a p(t).

The combination of 32, 34, and 35 delivers a string of p(t)s to amplifier unit 36 which supplies an excitation signal wave at an adequate amplitude to the transmitting transducer 38 to excite the space 100.

When a probing job is to be started, the system is triggered by a start signature emitted by start control 60. The signature enables 32 to start supplying a single period m-sequence of elements in $\{+1,-1\}$ to control the polarity of p(t) by employing the polarity encoder 35. 32 may be any cyclical m-sequence supplier circuit with a suitable gate for picking out a single period excerpt of it. Any other variational options for supplying the m-sequence may be used. For example, one can store the m-sequences that possibly may be used in a read-only memory and call for the needed one when it is needed. The other input port of 35 receives p(t) pulses from 34.

In the text of the Application, a single period m-sequence and a single period of an m-sequence are interchangeably used to refer to the same finite long sequence.

The p(t)s of the transmitted signal x(t) travel over the different ray paths in 100 and arrive at the receiving site with different delays. Summing up all the received signals at the receiving site, we have the composite received signal. It is designated as y(t) and is equal to $r_o(t) * x(t)$ to be explained below.

One can understand the formation of the composite received signal y(t) using another approach. If at the transmitting site there is sent into the space a delta function, then at the receiving site there will be received a plurality of differently delayed, differently signed, and differently attenuated (and differently dispersed) delta functions. The totality of the delayed delta functions is the collective response of the space to the transmitted delta function. This is the true impulse response function, designated $r_o(t)$, of the space 100. It is clear that $r_o(t)$ carries the time-delay and intensity informations needed in travel times estimation and more. The composite received signal y(t) is the convolution of $r_o(t)$ with x(t). An $r_o(t)$ used for illustration in our example is shown in FIG. 5-(c). The intensity of $r_o(t)$ fades out with increasing t. A y(t) used for illustration in our example is shown in FIG. 5-(d). Being used only for illustration, they are not drawn to scale and are not drawn with enough precision.

Accompanying y(t) received is a background noise $n_i(t)$. y(t) and $n_i(t)$ are superposed together and cannot be separated from each other. $[y(t)+n_i(t)]$ is collected by the receiving transducer 42-x included as part of receiver 42. The time-discretized versions of y(t) and $n_i(t)$ of the example are respectively shown in FIGS. 5-d and 5-e together with their analog versions; they are depicted in the form of sampled-value lines.

Duration of $[y(t)+n_i(t)]$ in which the set of data is useful for obtaining a meaningful likeness of the true impulse response function of the given space is referred to as the duration of useful data. Duration of useful data starts at the instant of starting of y(t) which is the starting instant of x(t), and ends no earlier than $[T+T_o]$ after the starting of x(t). Here $T_o$ is used to denote the longest time duration for the probing signal to travel over a ray path in the space in which the energy of the signal is consumed up to such a low level that the part of the finally obtained likeness of $r_o(t)$ corresponding to this ray path is marginally discernible from the processed background noise. $T_o$ is referred to as the duration of useful processed output (of the likeness of $r_o(t)$).

The likeness of $r_o(t)$ finally obtained by processing $[y(t)+n_i(t)]$ in 50 is cyclically repepititive at a repetition period same as the duration T of the probing singal x(t). The processed likeness of $r_o(t)$ is embedded in a background of residual processed noise. As $r_o(t)$ fades with time, the likeness of $r_o(t)$ also fades with time. By making T long enough, the overlapping of the early part of the likeness of $r_o(t)$ with the trailing part of it would be not noticeable in the processed background noise. The required duration of T to meet such a requirement is referred to as required duration of T. It is clear that the required duration of T is greater than $T_o$.

$[y(t)+n_i(t)]$ is to be repeatedly cross-correlated in a cross-correlator with a reference signal at sufficiently many different lag shifts. In order that it can be repeatedly recalled with a quality that the data can be practically immune to ambient noise of average power in the electronics, it is to be recorded digitally. $[y(t)+n_i(t)]$ is converted into a binary digital signal sequence by an A/D converter 43 and then recorded by a digital recorder 44 into memory 45 (labelled 45/53). A/D conversion and digital recording are also started by the starting control signature emitted by 60. The A/D converted $[y(t)+n_i(t)]$ for a duration of useful data is called the data set. Sampling interval $t_s$ in the example shown in FIG. 5 is $t_o/2$. The clock for $t_s$ clocking is called the second clock of the system.

The first clock and the second clock can be differently located, but they MUST BE somehow INTERLOCKED. $t_o/t_s$ MUST BE AN INTEGER. In the example shown in FIG. 4, $t_o/t_s$ is chosen to be 2, and the first clock and the second clock share the same time base generator 22 of unit 20 for interlocking. Of course, one can somehow interlock the two clocks in whatever other feasible ways. Recommendedly $t_o/t_s$ is a nonnegative power of 2 for convenience of system implementation, i.e., $t_o/t_s = 1, 2, 4 \ldots$. The simplest choice of $t_s$ is to choose it to equal to $t_o$. Making $t_o/t_s$ an integer assures that the emanating of an element of the m-sequence of x(t) hidden in y(t) happens at the instant of appearing of one out of every $t_o/t_s$ elements of the data set.

The data set recorded in memory 45/53 is to be forwarded to the processor section 50 to be processed. It is retrieved from the memory 53/45 by playing back and is then passed to the buffer memory of cross-correlator unit 55. The memory 45/53 can be a tape, for example. It is physically transportable. In our example, it is transported from 40 to the processor section 50. In FIG. 4, the memory in 40 is labelled 45/53; when it is physically transported to section 50 with recorded informations in it, it is relabelled 53/45. Play-back unit 51 in 50 is used to retrieve the recordings in 53/45.

Since duration of useful data is to be no shorter than $[T+T_o]$ in terms of real time, in terms of real time the length of the recorded digitized $[y(t)+n_i(t)]$ data to be stored in the buffer memory of 55 is recommendedly no shorter than $[T+T_o]$. In terms of number of binary code words the length of the data set is recommendedly no shorter than $[T+T_o]/t_s$. The data set is to stay in the buffer memory of 55 during the entire procedure of processing till a likeness of $r_o(t)$ for a duration of useful output is obtained. The duration of useful data needs not to be longer than $[T+T_o]$ since a duration longer than $[T+T_o]$ cannot contribute to securing of the likeness of $r_o(t)$ while on the other hand too long a data set would let too long a passage of $n_i(t)$, which can only be harmful, to be processed.

What may be simultaneously recorded in an auxilliary channel of the memory 45/53 is the x(t)-starting signature emitted by 60. The recorded x(t)-start signature can be used to indicate the starting instant of x(t) and hence the starting instant of the data set.

A reference weight set is also to be supplied to 55. It is to cross-correlate with the data set in 55. 55 contains a cross-correlator and its buffer memory. The buffer memory of 55 stores the data set fetched from 40 and the reference weight set supplied by a suitable source.

The reference weight set is a cyclically repetitive sequence of digital coded numbers. It is called a special reference weight set. It is the digitized version of a string of wavelets of a pre-chosen low-pass waveform q(t) polarity-controlled by the same cyclically repetitive m-sequence; a cycle of which polarity-controls the p(t)s of x(t). If the m-sequence controlling the string of q(t)s is presented as a clock-timed sequence, when counted in terms of real time, the bit duration is to be set precisely to equal $t_o$ and the sampling/digitizing interval is to be set precisely to equal $t_s$. $t_s$ is the sub-multiple of $t_o$ explained above. The special reference weight set stored in the buffer memory of 55 and ready to participate in cross-correlation operation is a mere sequence of digital coded words. When q(t) used in the example of FIG. 4 is a basic verion, the reference weight set provider 56 simply provides the m-sequence in $\{+1,-1\}$.

The steps of processing are initiated by a processing start control signature emitted by 59. Cross-correlation function computation starts when both the data set and the special reference weight set are loaded in the buffer memory of 55 and readily accessible by the cross-correlator of 55. They get multiplied in the cross-correlator of 55 in element-pairs made up of elements of the data set and the correctly paired elements of the special reference weight set. Multiplications are carried out over the scope of the useful data set, and the products are summed up also over the scope of the useful data set. The sum of the products is called a yield of a round of cross-correlation operation. After one round of cross-correlation operation is completed, the special weight set is shifted by one lag shift step toward the "future time" of the data set, and the cross-correlation operation repeats. The size of a shift step is a $t_s$ if counted in terms of real time. Completing cross-correlation operations at sufficiently many relative lag shifts, the successive yields of rounds of cross-correlation operations are used to form the cross-correlation function of the data set and the reference weight set. It is a function of the number of lag shift steps. $T_o/t_s$ rounds of cross-correlation operation completes the computation for one cycle of the wanted cross-correlation function of the data set and the reference weight set.

As mentioned in the above, the multiplication-and-addition manipulation of one complete round of cross-correlation operation spans over the scope of the duration of the useful data, a length no shorter than $[T+T_o]$ (or, recommendedly, 2T) in terms of real time. When the scope of cross-correlation operation is equal to an integral multiple of T, performance of filtering of non-white background noise can be more desirable.

55 is called by the inventor as a sorter-buncher, because it functions to sort out the individual responses of the space to the individual wavelet excitations and bunch them up in a perfectly additive manner to yield the accumlated response.

The cross-correlation process in 55 proceeds at a speed determined by the speed of the digital cross-correlator.

Now, turn to the issue of choosing q(t). We emphasize that choosing q(t) to be a delta function of time is the preferred and basic choice of waveform q(t). This is because it means computation time economy. Choosing q(t) to be a delta function of time is called using the basic version of the reference weight set (digitized s(t))for cross-correlation operation.

When using the basic version of the reference weight set, we are to tolerate taking a delta function of time and a simple pulse of unity intensity to be "equivalent". Being so tolerated, taking convolving a delta function of time with a q(t) and polarity-controlling the q(t) by the corresponding simple pulse to be "equivalent" to each other. Being so tolerated, the basic version of the reference weight set assumes a special, simple form: It is a sequence of binary digital words each representing a number of value $+1$ or $-1$. Therefore, when the basic version of the reference weight set is used, multiplication of the data set by the reference weight set is degenerated into simple polarity-sampling of the data set by the reference weight set. It is seen that using the basic version makes cross-correlation operation and cross-correlation function operation very neat and simple; the computational load is greatly reduced.

If, for any reason it is required to employ a certain q(t) (say, to employ a p(t) for a q(t)) which is not a delta function, one can have two optional approaches to do the job: Either employing a reference weight set which is formed of using the assigned required q(t), or employing the basic version for forming the digitized s(t) and further filtering the processed output by a filter $q(-t)$. It is seen that as compared with the case of using the basic version, using the non-basic version would involve a much more complicated cross-correlation-function operation because of that the complication of the weight set necessitates a true multiplication which requires a greater computing load. We now see why we say that choosing the waveform q(t) to be a delta function of time is the preferred and basic choice of q(t).

Let it be in our example that q(t) is a delta function of time so that the special reference weight set is a cyclically repetitive sequence of binary coded words representing the set of elements of the cyclically repetitive m-sequence in $\{+1, -1\}$. The reference weight set m-sequence in our example is provided locally in 56 of 50 and is loaded into the buffer memory of 55 to cross-correlate with the data set.

Proper cross-correlation operation requires correctly pairing the elements of the reference weight set m-sequence with the to-be-paired-with elements of the data set. In our example, pairing of the elements of the data set and the reference weight set is so arranged that one element of the reference weight set m-sequence pairs with one out of every $t_o/t_s$ element(s) of the data set. This is because that for the basic version case, there is only one sample of q(t) in one bit duration of the polarity-controlling m-sequence.

As mentioned in the above, the relative lag shift step is a $t_s$ when counted in terms of real time. $t_s$ is the sampling interval of the A/D converter 43 in 40.

By making sampling interval $t_s$ a sub-multiple of $t_o$ and pairing a member of the m-sequence locally supplied in 50 with one out of $t_o/t_s$ members of the data set, one implicitly pairs a member of the m-sequence of x(t) in 30 with a member of the m-sequence (which is the reference weight set) locally supplied in 50 every $t_o/t_s$ steps of lag shift. Implicit pairing of the m-sequence of x(t) in 30 with the locally supplied m-sequence in 50 assures compression of x(t) into its desired compressed version.

Illustrated in FIGS. 5-f, 5-g, & 5-h are reference weight sets in our example at first three successive shift step positions when the basic version is used. They are simply m-sequences in numbers +1 or −1 as depicted in the figures. (Here, they are not shown as binary digital words but are shown as "time-discretized" numbers). The reference weight set shown in FIG. 5-f is the reference weight set for the zeroeth shift step position; it is the same cyclically repetitive m-sequence in $\{+1, -1\}$ shown in FIG. 5-a. Note that although the reference weight sets as shown in FIGS. 5-f, 5-g, & 5-h appear as if they are functions of time, substantially they are mere cyclically repetitive m-sequences and the abscissa does not have to be time when they are in 55 and to be paired with the data set. What is substantial is that one element of the reference weight set is to be paired with one out of every $t_o/t_s$ elements of the data set when performing "multiplication" in cross-correlation operation. The time-discretized $[y(t) + n_i(t)]$ (the data set without quantization) is the sum of the sampled y(t) shown in FIG. 5-d and the sampled $n_i(t)$ shown in FIG. 5-e. The data set stored in memory 45/53 is just a mere sequence and does not directly appear as function of time. The shaded areas shown below FIG. 5-e show the options of the span of the window opening that gates the nominally endlessly cyclically repetitive m-sequence for reference weight set use. In terms of real time, a window of span of $T + T_o$ can be said to be the marginal minimum, while a span of 2T is recommended.

We can therefore see that making $t_o/t_s$ an integer SOLVES the problem of making the elements of the cyclically repetitive m-sequence (the elements of the reference weight set) surely pair with the elements of the single period m-sequence of x(t) so that when performing cross-correlation operation ON digitized $[y(t) + n_i(t)]$ BY the reference weight set, one in effect pairs the elements of the reference weight set m-sequence with the m-sequence of x(t) for every $t_o/t_s$ steps of shift to seek sure compression of x(t) into its compressed version.

Now, let us see the issue of provision of the reference weight set which is nominally indefinitely repetitive and hence nominally infinitely long. Since the number of members of the digitized $[y(t) + n_i(t)]$ data set (which are to be paired with the members of the reference weight set) is finite, the reference weight set needs not to be indefinitely repetitive; its active portion is finitely long as can be seen in using the said window. In terms of real time, for each complete round of cross-correlation operation, the active reference weight set is to be no shorter than the duration of useful data, $[T + T_o]$ (or 2T), but it does not need to be longer. For the basic version case, there is only one weight member in a bit duration of the reference m-sequence, so the number of weight set members needed in one complete round of cross-correlation operation is $[T + T_o]/t_o$ (or, $2T/t_o$). In the same time duration $[T + T_o]$ (or, 2T), the number of members in the data set is $[T + T_o]/t_s$ (or, $2T/t_s$). Within the duration of useful data, one out of every $t_o/t_s$ members of the data set is to be paired with one member of the reference weight set m-sequence. When the integer $t_o/t_s$ is greater than 1, there are inter-word zero-words (nils) in the reference weight set sequence. Namely, when pairing the reference weight set with the data set, there is an interleaving space of $[t_o/t_s - 1]$ nils (zero-weight words) in between each couple of members of the weight set.

As it is explained in the above, after completion of each complete round of cross-correlation operation, the weight set is to be given a shift towards the "future time" of the data set. The total amount of time of shifts in terms of real time is $T_o$ which is the duration of useful processed output. Therefore, size (length) of the potentially needed weight set in terms of real time is to be no shorter than $\{[T + T_o] + T_o\} = \{T + 2T_o\}$ (or, 3T), but it does not need to be longer.

The reference signal sequence provider unit 56 is to be provided with the capability of providing m-sequences of all different parameters that are possibly to be employed for forming x(t) (in block 32) and with the capability of providing weight sets long enough as explained above to meet the said total length requirement. As it has been explained above, the reference weight set to be actively in use in each round of cross-correlation operation in the processor cross-correlator (the sorter-buncher) is a gated portion of the nominally indefinitely long cyclically repetitive weight set gated by the window. The width of the window in terms of real time is $T + T_o$, the time duration of the useful data set. Each time a round of cross-correlation operation is completed, the nominally indefinitely long weight set "slides" through the window by one step which corresponds to a sampling interval. When there is one weight member sliding out of the window, there is one weight member sneaking into the window.

The digitized cross-correlation function is a digitized likeness of $r_o(t)$. Converting the digitized samples by a D/A converter (which is part of the output unit 58) into discrete-time samples, one obtains the discrete-time version of the likeness of $r_o(t)$ which can be printed out or presented in whatsoever wanted format. One can stop cross-correlation operation after completing all the rounds of cross-correlation operations for all the lag shifts over a $T_o$ in terms of real time, at will.

Returning finally to the system 10 shown in FIG. 4, it is to be remarked that if the cross-correlator of 55 can process to yield the cross-correlation function so fast that real time processing can be achieved, one can combine 50 with 40, and the physically transportabilty of memory can be removed. The output of A/D converter 43 of 40 can be directly hooked up with buffer memory of 55 of 50.

System 10 depicted in FIG. 4 is only an example of the embobiment of a system using the method of the invention. Variations of embodiment of the method of the invention can be readily implemented by using the same spirit inspired in system 10.

We claim:

1. A method of estimating time durations for a given finite duration compressible probing signal x(t)to travel from a given transmitting site to a given receiving site through a substantially linear given space containing multiple unknown ray paths, said compressible probing signal x(t) being an electrical signal and being converted into mechanical form through substantially linear transmitting transducer to excite the space, at said given receiving site a total electrical collected signal, which is a sum of received signal denoted y(t) and background noise denoted $n_i(t)$, being procured through substantially linear receiving transducer, true impulse response function of the space between the transmitting site and the receiving site being denoted $r_o(t)$, said received signal y(t) being response of the space via the transmitting and receiving transducers to the probing signal x(t), total collected signal $(y(t)+n_i(t))$ being processed by performing cross-correlation operation with a reference signal s(t) at a plurality of relative time-shift steps to obtain a cross-correlation function as a total processed output which contains sum of a processed signal $z(t)=(y(t) \times s(t))$ and a processed noise $n_o(t)=(n_i(t) \times s(t))$, total processed output $(z(t)+n_o(t))$ revealing an image of $r_o(t)$, duration of said compressible probing signal x(t) being no shorter than the travel time of x(t) along any of said multiple unknown ray paths through which it reaches the receiving site at an energy level that is detectible after processing in a background of processed noise, estimation of time durations for the probing signal to travel from the given transmitting site to the given receiving site through the given space along the multiple unknown ray paths being based on determination of time positions of signal arrival spikes displayed in said cross-correlation function, wherein the method is characterized in that:

a. the compressible probing signal x(t) used in the method is a finite duration string of wavelets each substantially having a pre-determined pulse waveform p(t) whose energy is substantially distributed over a frequency band which is centered around zero frequency and includes the zero frequency, accordingly in frequency domain said pulse waveform p(t) having a definitely non-zero spectral density at zero frequency and therefore in time domain said pulse waveform p(t) having a definitely assured non-zero area, characteristic of elements of the string of said wavelets being controlled in sequential order by state of elements of a single period of an m-sequence clocked at a pre-determined bit duration $t_o$, duration of x(t) being equal to time-duration T of the single period of said m-sequence;

b. the reference signal s(t) used in the method for performing cross-correlation operation with the total collected signal is a cyclically repetitive string of wavelets each substantially having a predetermined pulse waveform q(t) in frequency domain said waveform q(t) having a definitely non-zero spectral density at zero frequency and therefore in time domain said pulse waveform q(t) having a definitely assured non-zero area, characteristic of elements of the string of said wavelets in s(t) being controlled in sequential order by state of elements of cyclical repetition of the single period of the fit-sequence that controls the wavelets in x(t) and is clocked at precisely the same bit duration $t_o$ as the bit duration of m-sequence in x(t), cross-correlation function of said $(y(t)+n_i(t))$ with said s(t) being total processed output $(z(t)+n_o(t))$ revealing cyclical repetition of an image of $r_o(t)$.

2. The method of claim 1, wherein widths of impulse response functions of the transmitting transducer and the receiving transducer are chosen narrow enough to ensure that convolution of $r_o'(t)$, which is used to denote impulse response function of cascade of the two transducers and the space, with core part of compressed version of x(t) which is $L(p(t)*q(-t))$ can reveal all those details of $r_o(t)$ that can satisfy required degree of resolution of the processed output, an attribute of the method of the invention being that the widths of p(t) and q(−t) may be chosen arbitrarily narrow in practice.

3. The method of claim 2, wherein the compressible probing signal x(t) is a finite duration string of wavelets each substantially having the predetermined pulse waveform p(t), width of a p(t) being narrower than such a width that required degree of resolution of the processed output can be secured, polarity of elements of the string of the wavelets in x(t) being controlled in sequential order by elements in $\{+1,-1\}$ of a single period of an m-sequence, said m-sequence being generated in compliance with a pre-determined primitive polynomial of a pre-determined order n at the pre-determined bit duration $t_o$, number of elements in a period of m-sequence being $L=2^n-1$ and time duration of a period of the m-sequence being $T=Lt_o$, duration of x(t) being equal to T.

4. The method of claim 1, wherein the reference signal s(t) is a nominally endless cyclically repetitive string of wavelets each substantially having the predetermined pulse waveform q(t), width of a q(t) being no wider than width of a p(t), polarity of elements of the string of the wavelets in s(t) being controlled in sequential order by elements in $\{+1,-1\}$ of cyclical repetition of the single period of the m-sequence that controls the wavelets in x(t).

5. The method of claim 4, wherein pulse waveform q(t) employed in forming s(t)is a delta function of time in place of employment of required q(t) In forming s(t), and a filter of impulse response function q(−t) is used to post-filter output of cross-correlation operation to make up missing functioning of the required q(t), whereby when a delta function of time is employed in place of the required q(t)in forming s(t), such an s(t) in cross-correlation operation is eventually degenerated into a sampling sequence which is an elementary cyclically repetitive m-sequence in number set $\{+1,-1\}$, and consequently cross-correlation operation using such a degenerated s(t) as reference signal being turned into a "polarity-sample and add" operation which results in overall processing time saving.

6. The method of claim 5, wherein q(t) employed in forming s(t)is a p(t) when background noise $n_i(t)$is white.

7. The method of claim 5, wherein q(t) employed in forming s(t) is a delta function of time and no post-filtering of output of cross-correlator by q(−t) is used when $n_i(t)$ is colored.

8. The method of claim 1, wherein the width of p(t) relative to the bit duration $t_o$ of the m-sequence is so chosen that ratio of the width of p(t) to $t_o$, which is called duty-cycle ratio of x(t), is close to unity, whereby raw data acquisition time-saving is secured.

9. The method of claim 1, wherein the pulse waveform p(t) in wavelets contained in x(t) and the pulse waveform q(t) in wavelets contained in s(t) have energy distributions in frequency domain being such that said pulse waveform p(t) and said pulse waveform q(t) both have definitely non-zero spectral density at zero frequency and therefore in time domain both said pulse waveforms p(t) and q(t) have definitely assured non-zero area, so that core part of the compressed version of x(t) which is L(p(t)*q(−t)) has a definitely non-zero spectral density at zero frequency and accordingly has a definitely assured non-zero area in time domain, whereby the method of the invention is free from zero area problem.

10. The method of claim 9, wherein the pulse waveforms p(t) and q(t) are both non-oscillatory so that the core part of the compressed version of x(t) does not have area-diminishing problem owing to offsetting of oppositely-signed area parts in the waveform of the core part of the compressed version of x(t) and consequently intensity of processed signal z(t) is not diminished due to area diminishing problem owing to offsetting of oppositely-signed area parts in the waveform of the core part of the compressed version of x(t).

11. The method of claim 7, wherein width of the pulse waveform p(t) is narrower than width of the most refined detail of $r_o'(t)$ which is determined by widths of impulse response functions of transmitting and receiving transducers, so that the width of p(t) in wavelets forming x(t) can be chosen arbitrarily narrow while area of the core part of the compressed version of x(t), which equals area of Lp(t) when q(t) is a delta function of time, can be maintained substantially invariant of the width of p(t), and consequently intensity of processed signal z(t) can accordingly be maintained substantially invariant of the width of p(t) provided T and energy of x(t), which is time-integral of $x^2(t)$ over the period T, are fixed and the duty-cycle ratio of x(t) is fixed.

12. The method of claim 11, wherein width of the pulse waveform p(t) is narrower than width of impulse response function of the transmitting transducer, whereby power rating of transmitting transducer needed for safe operation can be reduced by decreasing the width of p(t) with intensity of processed signal z(t) being maintained substantially invariant of such decrease of width of p(t) under the condition that the duration T and energy of x(t) are fixed and the duty-cycle ratio of x(t) is fixed.

13. The method of claim 7, wherein the bit duration $t_o$ of said m-sequence is narrower than shortest correlation time of colored part of $n_i(t)$, and q(t) employed in formation of reference signal s(t) for cross-correlation operation is chosen a delta function of time, so that s(t) assumes degenerated form of a cyclically repetitive m-sequence in $\{+1,-1\}$ which is a PSEUDO-RANDOM sequence, whereby multiplication step in cross-correlating $n_i(t)$ samples with such a degenerated s(t) of pseudo-random nature decorrelates originally correlated samples of colored part of $n_i(t)$ and resultantly mean square value of processed noise is minimized.

14. The method of claim 1, wherein duration of total collected signal used in processing for obtaining cross-correlation function is no shorter than $(T+T_o)$ and not substantially longer than $(T+T_o)$ so that substantially no probing information is lost and substantially no data that mainly carries background noise which would only degrade signal-to-noise ratio are processed, $T_o$ being longest travel time for the probing signal x(t) to propagate from the transmitting site to the receiving site along any of said multiple unknown ray paths through which it reaches the receiving site at energy level that is detectible after processing, $T_o$ being also called effective duration of $r_o(t)$.

15. The method of claim 1, wherein processing of total collected signal $(y(t)+n_i(t))$ by performing cross-correlation operation with the reference signal s(t) for obtaining cross-correlation function is a digital process, wherein $\{y(t)+n_i(t)\}$ being digitized at sampling interval $t_s$ and s(t) being digitized at precisely the same sampling interval $t_s$, each element of m-sequence of s(t) being aligned to pair with one out of $t_o/t_s$ bursts of digitized $(y(t)+n_i(t))$ data during digital cross-correlation manipulation, $t_o/t_s$ being precisely kept a pre-determined integer, said sampling interval $t_s$ being also size of a shift step in course of obtaining digitized cross-correlation function if counted in terms of real time.

16. The method of claim 1, wherein only a single cycle of cross-correlation function of $(y(t)+n_i(t))$ with s(t) is needed to be used as end result of the method, redundancy due to cyclical repetition of the cross-correlation function presented as the processed output in excess of one complete cycle can be discarded and correspondingly computation for producing redundant part of cyclically repetitive cross-correlation function can be eliminated.

17. The method of claim 4, wherein nominally endless cyclically repetitive s(t) for cross-correlation operation use can be truncated to have a finite time duration no shorter than duration of total received signal $(y(t)+n_i(t))$ used in cross-correlation operation plus one period of cross-correlation function needed as end result if counted in terms of real time.

* * * * *

UNITED STATES PATENT AND TRADEMARK OFFICE
CERTIFICATE OF CORRECTION

PATENT NO. : 5,426,618

DATED : June 20, 1995

INVENTOR(S) : Hong-Bin Chen and Neng Eva Wu

It is certified that error appears in the above-identified patent and that said Letters Patent is hereby corrected as shown below:

In column 1, line 56, change "non-whim" to --non-white--.

In column 40, line 9, change "fit-sequence" to --m-sequence--.

Signed and Sealed this

Twenty-eighth Day of May, 1996

Attest:

BRUCE LEHMAN

*Attesting Officer*          *Commissioner of Patents and Trademarks*